United States Patent
Kim et al.

(10) Patent No.: US 10,650,787 B2
(45) Date of Patent: May 12, 2020

(54) VEHICLE AND CONTROLLING METHOD THEREOF

(71) Applicant: HYUNDAI MOTOR COMPANY, Seoul (KR)

(72) Inventors: Dong Uk Kim, Incheon (KR); Hyun Jin Park, Seoul (KR); Sung Eun Yoon, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 510 days.

(21) Appl. No.: 14/941,522

(22) Filed: Nov. 13, 2015

(65) Prior Publication Data

US 2016/0196800 A1    Jul. 7, 2016

(30) Foreign Application Priority Data

Jan. 2, 2015    (KR) .................. 10-2015-0000192

(51) Int. Cl.
| | |
|---|---|
| *G06F 3/0484* | (2013.01) |
| *G09G 5/14* | (2006.01) |
| *G06F 3/0488* | (2013.01) |
| *G06F 3/0481* | (2013.01) |
| *G09G 5/00* | (2006.01) |

(Continued)

(52) U.S. Cl.
CPC ............... *G09G 5/14* (2013.01); *B60K 35/00* (2013.01); *B60K 37/04* (2013.01); *G06F 3/0481* (2013.01); *G06F 3/04847* (2013.01); *G06F 3/04883* (2013.01); *G06F 3/04886* (2013.01); *G09G 5/00* (2013.01); *B60K 2370/182* (2019.05); *B60K 2370/67* (2019.05); *G06F 3/02* (2013.01); *G06F 2203/04803* (2013.01); *G09G 2340/0407* (2013.01); *G09G 2340/0464* (2013.01); *G09G 2340/14* (2013.01); *G09G 2380/10* (2013.01)

(58) Field of Classification Search
CPC ............... G06F 3/017; G06F 3/04886; G06F 2203/04803; B60K 37/04; G09G 2380/10
See application file for complete search history.

(56) References Cited

U.S. PATENT DOCUMENTS

| | | | |
|---|---|---|---|
| 2004/0046796 A1* | 3/2004 | Fujita | G06F 3/0481 |
| | | | 715/767 |
| 2004/0147317 A1* | 7/2004 | Ito | A63F 13/06 |
| | | | 463/36 |

(Continued)

FOREIGN PATENT DOCUMENTS

| | | |
|---|---|---|
| CN | 103273894 A | 9/2013 |
| CN | 103907338 A | 7/2014 |

(Continued)

OTHER PUBLICATIONS

Korean Office Action dated May 2, 2016, issued in Korean Patent Application No. 10-2015-0000192.

(Continued)

*Primary Examiner* — Rinna Yi
(74) *Attorney, Agent, or Firm* — Morgan, Lewis & Bockius LLP

(57) ABSTRACT

A vehicle includes a display device for displaying a screen divided into regions, and a controller for changing the divided regions of the screen displayed by the display device in accordance with an upward movement or downward movement of the display device.

18 Claims, 25 Drawing Sheets

(51) Int. Cl.
  *B60K 35/00* (2006.01)
  *B60K 37/04* (2006.01)
  *G06F 3/02* (2006.01)

(56) References Cited

U.S. PATENT DOCUMENTS

| | | | |
|---|---|---|---|
| 2008/0158189 A1* | 7/2008 | Kim | G06F 3/04886 345/173 |
| 2009/0128317 A1* | 5/2009 | Hideshiro | B60K 35/00 340/459 |
| 2009/0256813 A1* | 10/2009 | Amici | B60K 35/00 345/173 |
| 2013/0010117 A1* | 1/2013 | Miyoshi | B60R 1/00 348/148 |
| 2014/0350784 A1* | 11/2014 | Imai | G06F 3/0412 701/36 |
| 2015/0041300 A1* | 2/2015 | Nishito | H03K 17/9622 200/5 A |
| 2015/0061856 A1* | 3/2015 | Raman | B60Q 9/00 340/457 |
| 2015/0084886 A1* | 3/2015 | Kamiyama | G06F 3/03548 345/173 |
| 2016/0161833 A1* | 6/2016 | Watanabe | B60K 35/00 345/7 |
| 2016/0200195 A1* | 7/2016 | Jun | B60K 35/00 715/765 |

FOREIGN PATENT DOCUMENTS

| | | |
|---|---|---|
| CN | 104245430 A | 12/2014 |
| JP | 2013-220736 A | 10/2013 |
| KR | 10-0608080 B1 | 8/2006 |
| KR | 10-2007-0106888 A | 11/2007 |

OTHER PUBLICATIONS

Chinese Office Action dated Jul. 31, 2019 issued in Chinese Patent Application No. 201510921168.0 (with English translation).

* cited by examiner

VEHICLE AND CONTROLLING METHOD THEREOF

CROSS-REFERENCE TO RELATED APPLICATION(S)

This application claims the benefit of priority to Korean Patent Application No. 10-2015-0000192, filed on Jan. 2, 2015 with the Korean Intellectual Property Office, the disclosure of which is incorporated herein by reference.

TECHNICAL FIELD

Embodiments of the present disclosure relate to a vehicle including a display device and a method of controlling the vehicle.

BACKGROUND

Vehicles may provide a variety of entertainment functions, such as music and television programs, in addition to basic driving functions.

Recently, various display devices installed in a vehicle that display media such as music data, video, and map information while a driver drives or stops the vehicle have been developed.

Media providing systems that provide various data or information in an audible form, a visible form, or a combination thereof are convenient for a user.

A display device for a vehicle, which provides a music service that reproduces music such as radio, compact disk (CD), MP3, and audio on demand (AOD), a video service that reproduces video such as digital versatile disk (DVD), and a navigation service that guides a route to a destination, may be installed in vehicles in order to enable the media providing systems.

SUMMARY OF THE DISCLOSURE

Therefore, it is an aspect of the present disclosure to provide a vehicle including a display device configured to display contents in divided regions of a screen and changing each region of the screen in accordance with an upward movement or downward movement thereof, and a method of controlling the vehicle.

Additional aspects of the disclosure will be set forth in part in the description which follows and, in part, will be obvious from the description, or may be learned by practice of the disclosure.

In accordance with one aspect of the present disclosure, a vehicle includes a display device configured to display a screen divided into regions, and a controller configured to change the divided regions of the screen displayed by the display device in accordance with an upward movement or downward movement of the display device.

The display device may display a horizontally divided screen, and the screen is divided into an upper region and a lower region based on a virtual reference region.

The controller may move the upper region in accordance with the upward movement or downward movement of the display device.

The controller may move the upper region to a position above the virtual reference region when the display device moves upward and move the upper region to a position below the virtual reference region when the display device moves downward.

The controller may move the upper region at the same speed as a speed of the upward movement or downward movement of the display device.

The controller may change the divided regions at a predetermined timing when the display device moves upward or downward.

The display device may move upward when the vehicle is running and move downward when the vehicle is stopped.

The display device may move upward when a navigation service is provided and move downward when the navigation service is terminated.

The display device may move upward when a driving route of the vehicle is set and move downward when the driving route is not set.

The display device may be implemented using a touchscreen and move downward when a screen requiring a user's touch manipulation is displayed.

The vehicle may further include a gear manipulation lever configured to manipulate a gear of the vehicle, and the display device may move upward when the gear manipulation lever is in a drive gear position and move downward when the gear manipulation lever is in a neutral gear position or in a parking gear position.

The vehicle may further include wheels, an accelerator pedal configured to receive a manipulation to accelerate the wheels input by a user, and a brake pedal configured to receive a manipulation to brake the wheels input by the user, and the display device may move upward when the acceleration manipulation is input and move downward when the braking manipulation is input.

The vehicle may further include an illumination sensor, and the display device may move upward or downward in accordance with an output value of the illumination sensor.

The vehicle may further include a driver's seat and a front passenger's seat, and the display device may include a main display disposed in a center fascia between the driver's seat and the front passenger's seat.

The vehicle may further include a mode region extending from a dashboard disposed in front of the driver's seat and the front passenger's seat to be spaced apart from a front surface of the main display.

The display device may further include a mode display installed in the mode region.

The vehicle may further include emergency lamps, and the mode display may be implemented using a touchscreen, and the emergency lamps may be turned on or off in accordance with a user's manipulation of the touchscreen.

The mode display may display different contents in accordance with the upward movement or downward movement of the main display.

The mode region may include a hard key configured to receive a manipulation input by a user.

The display device may display different contents in accordance with the upward movement or downward movement of the display device.

The upper region may display different contents in accordance with the upward movement or downward movement of the display device.

The lower region may display different contents in accordance with the upward movement or downward movement of the display device.

The controller may scale up or scale down the upper region and the lower region of the screen displayed by the display device in accordance with the upward movement or downward movement of the display device.

The controller may scale up the upper region and scale down the lower region when the display device moves upward and scale down the upper region and scale up the lower region when the display device moves downward.

The controller may scale up or scale down the upper region and the lower region at the same speed as a speed of the upward movement or downward movement of the display device.

In accordance with another aspect of the present disclosure, a method of controlling a vehicle includes determining whether to move upward or downward a display device, and changing divided regions of a screen displayed by the display device in accordance with an upward movement or downward movement of the display device.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
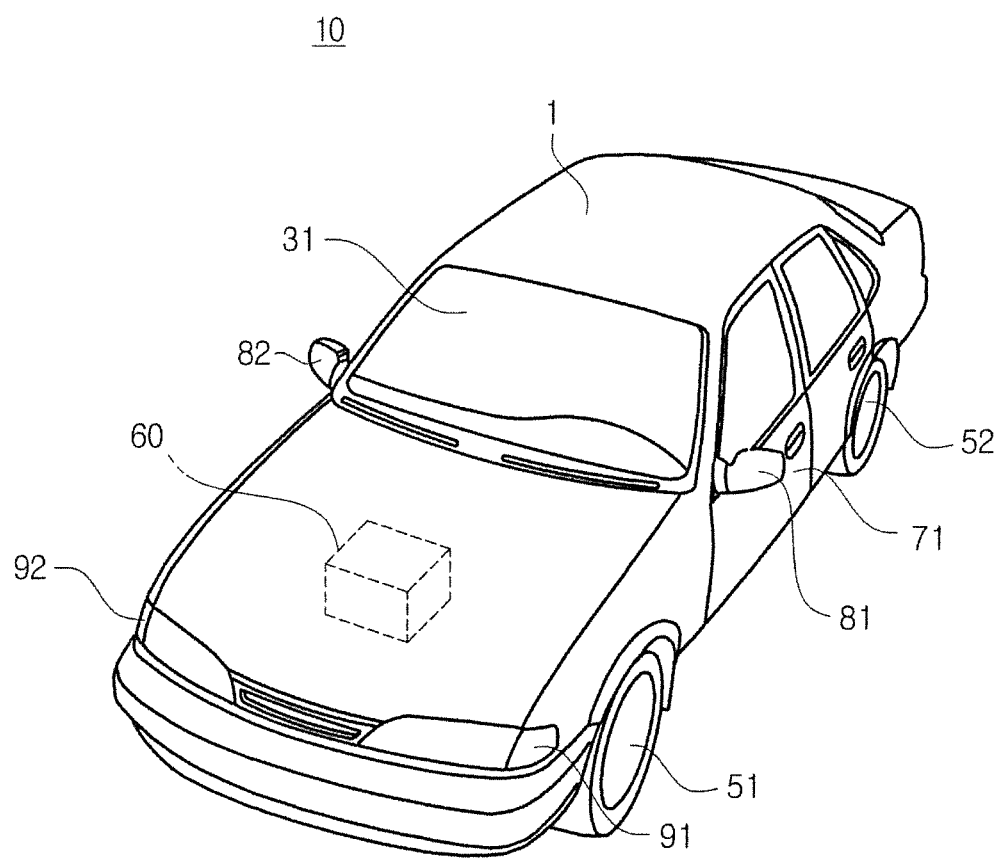
FIG. 1 is a schematic diagram for describing an appearance of a vehicle.

Reference will now be made in detail to the embodiments of the present disclosure, examples of which are illustrated in the accompanying drawings, wherein like reference numerals refer to like elements throughout. In the drawings, the same or similar elements are denoted by the same reference numerals even though they are depicted in different drawings. In the following description of the present disclosure, a detailed description of known functions and configurations incorporated herein will be omitted when it may make the subject matter of the present disclosure rather unclear. In addition, terms in the following description, such as first, second, etc., are used to discriminate one element from other elements, but do not limit such elements.

Figure 2:
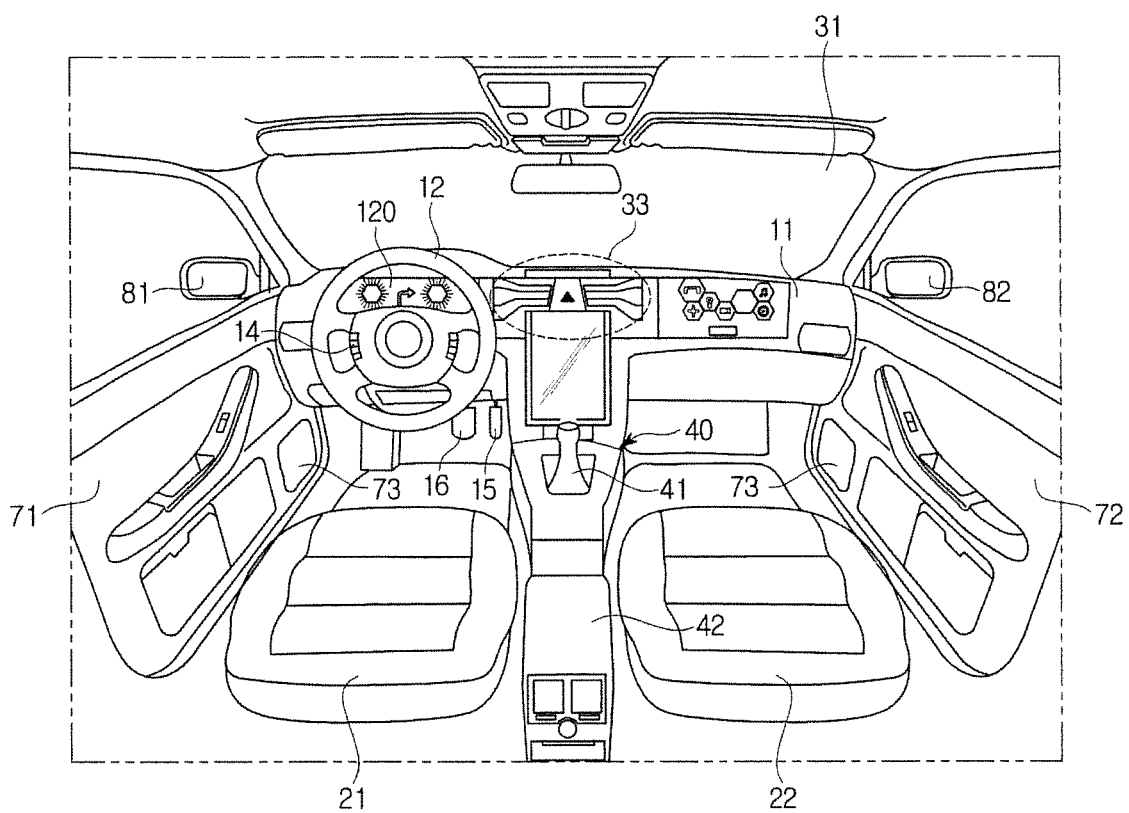
FIG. 2 is an interior view of a vehicle.
Figure 3:
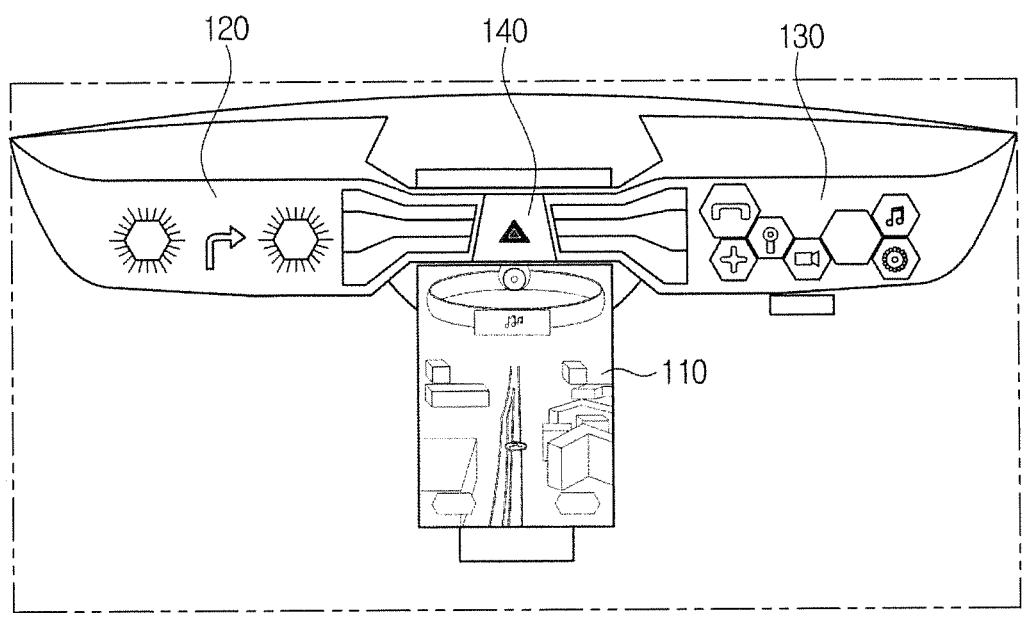
FIG. 3 is a view of a display device installed in a vehicle.

Hereinafter, a vehicle will be described with reference to FIGS. 1 to 3. FIG. 1 is a schematic diagram for describing an appearance of the vehicle. FIG. 2 is an interior view of the vehicle. FIG. 3 is a view of a display device installed in the vehicle.

Referring to FIG. 1, a vehicle 10 according to an embodiment includes a body 1 defining an external appearance of the vehicle 10, wheels 51 and 52 configured to move the vehicle 10, a drive device 60 configured to rotate the wheels 51 and 52, doors 71 and 72 configured to shield the inside of the vehicle 10 from the outside (FIG. 3), a front glass 31 configured to provide a driver sitting in the vehicle 10 with a forward view of the vehicle 10, side mirrors 81 and 82 configured to provide the driver with rear views of the vehicle 10, and emergency lamps 91 and 92 configured to indicate or warn an emergency situation of the vehicle 10.

The wheels 51 and 52 include front wheels 51 disposed at front portions of the vehicle 10 and rear wheels 52 disposed at rear portions of the vehicle 10, and the drive device 60 provides rotational force to the front wheels 51 or the rear wheels 52 such that the body 1 moves forward or backward. The driving device 60 may include an engine configured to generate the rotational force by combustion of fossil fuels or a motor configured to generate the rotational force by receiving power from an electric condenser (not shown).

The doors 71 and 72 are pivotally coupled to the body 1 at left and right sides and the driver may get into the vehicle 10 by opening the door, and the inside of the vehicle 10 may be shielded from the outside by closing the door.

The front glass 31 is disposed at a front upper portion of the body 1 to allow the driver sitting in the vehicle 10 to acquire visual information about the forward view of the vehicle 10, and is also called a windshield glass.

The side mirrors 81 and 82 include a left side mirror 81 disposed at the left side of the body 1 and a right side mirror 82 disposed at the right side of the body 1 and allow the driver sitting in the vehicle 10 to acquire visual information about side views and rear views of the vehicle 10.

The emergency lamps 91 and 92 include a left emergency lamp 91 disposed at the left side of the body 1 and a right emergency lamp 92 disposed at the right side of the body 1 and are turned on or off in accordance with a manipulation by the driver sitting in the vehicle 10.

The vehicle 10 may further include a sensing apparatus such as a proximity sensor to detect obstacles or another vehicle present at lateral sides and a rear side of the vehicle 10, a rain sensor to sense an amount of water, and an illumination sensor to sense luminance.

In addition, referring to FIG. 2, a steering wheel 12 may be disposed on a dashboard 11 at a driver's side and a cluster display 120, which displays a speed gauge indicating a current speed of the vehicle 10, an RPM gauge indicating a revolution per minute (RPM) of the vehicle 10, and information about the vehicle 10 on a digital screen, may be disposed in a region of the dashboard 11 adjacent to the steering wheel 12. The steering wheel 12 may be provided with a cluster input unit 14 to receive an option related to the information displayed on the cluster display 120 and selected by the driver.

A jog shuttle type or hard key type central input unit (not shown) may be disposed in a center console 40. The center console 40 is disposed between a driver's seat 21 and a front passenger's seat 22 and includes a gear manipulation lever 41 and a tray 42.

The driver may shift a gear to a drive gear D position, a neutral gear N position, a parking gear P position, or other gear positions by manipulating the gear manipulation lever 41.

In addition, the doors 71 and 72 may be provided with a sound unit 73 configured to output sounds.

The sound unit 73 outputs reproduced sounds to a user under control of a controller 200, which will be described later with reference to FIG. 6. In this regard, the user includes the driver and passengers of the vehicle 10.

The sound unit 73 may be implemented using a speaker or an amplifier and may be disposed at any other positions in the vehicle 10 in addition to the doors 71 and 72.

The driver's seat 21 may be provided with an accelerator pedal 15 to receive a manipulation to accelerate the wheels 51 and 52 and a brake pedal 16 to receive a manipulation to brake the vehicle 10 from the driver.

The vehicle 10 may also include an air conditioner (now shown) configured to control temperature inside the vehicle 10, and the controller 200 may control the temperature inside the vehicle 10 by controlling the air conditioner. The air conditioner may heat and cool the inside of the vehicle 10 and may control the temperature of the inside of the vehicle 10 by discharging heated or cooled air via vents.

Since the air conditioner installed in the vehicle 10 is well known in the art, detailed descriptions thereof will not be given herein.

Meanwhile, the vehicle 10 according to an embodiment may further include various display devices in addition to the cluster display 120.

Referring to FIG. 3, the vehicle 10 may include a main display 110 mounted on a center fascia 33 located at the center of the dashboard, the aforementioned cluster display 120, a passenger display 130 mounted on the dashboard at the front passenger's seat side 22, and a mode display 140 protruding from the center of the dashboard and disposed at a mode region 34 that screens a portion of the main display 110, as display devices. In this case, the cluster display 120, the passenger display 130, or the mode display 140 may be dispensed with, if required.

Figure 4:
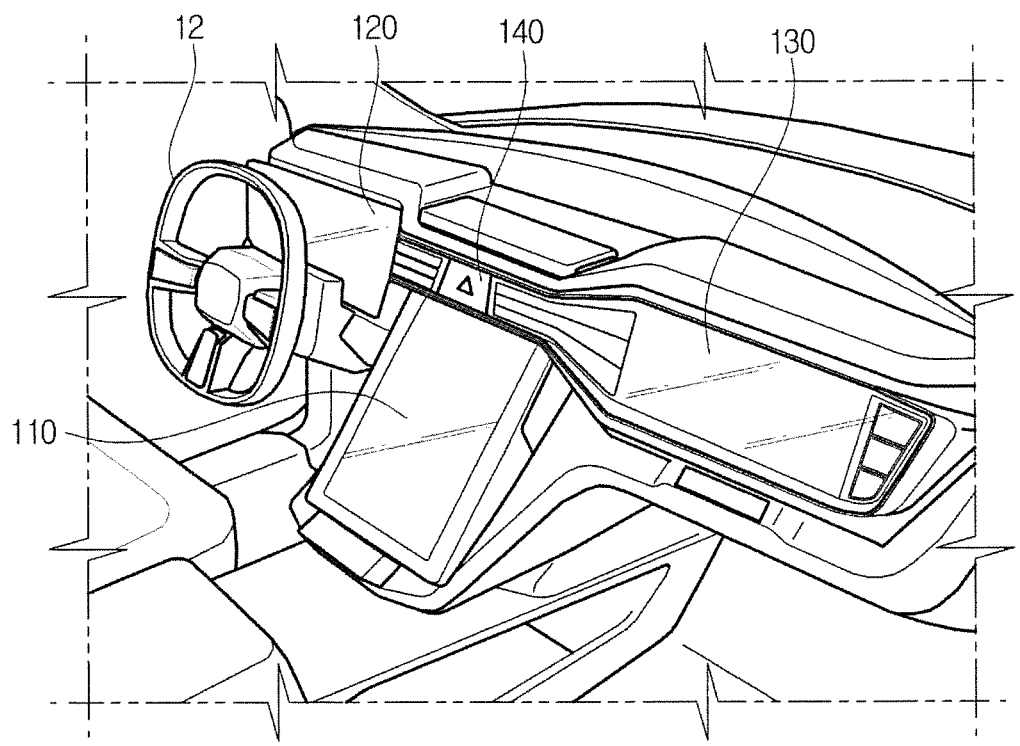
FIGS. 4 and 5 are internal perspective views of a vehicle including a main display.
Figure 5:
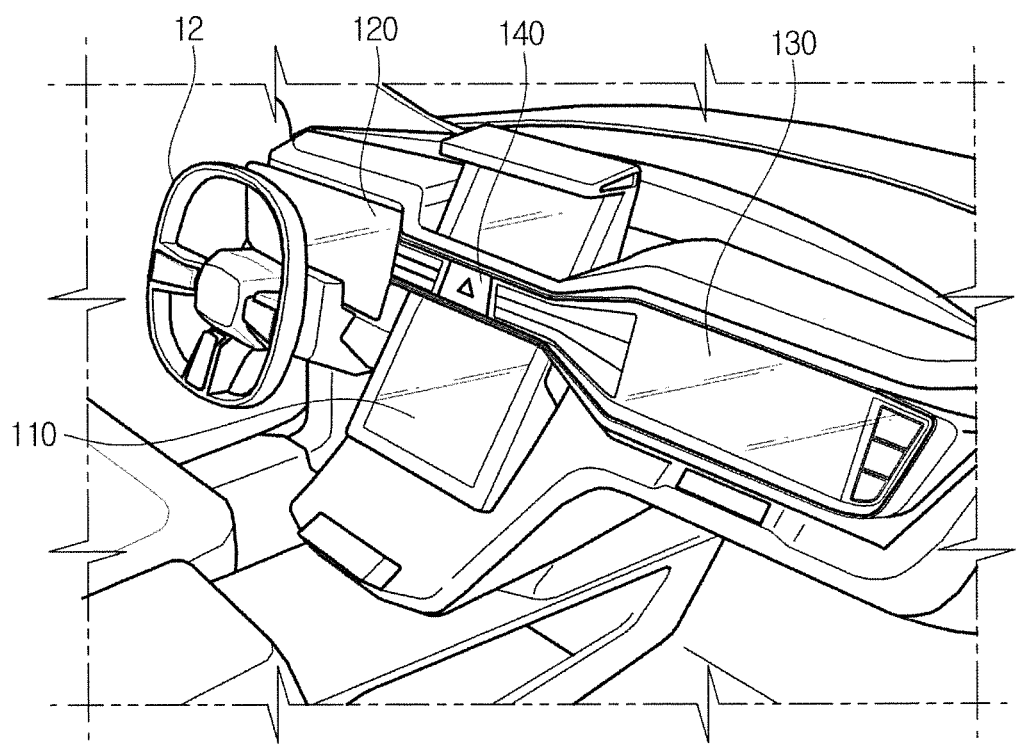

FIGS. 4 and 5 are internal perspective views of a vehicle including a main display. FIG. 6 is a control block diagram of the vehicle.

Referring to FIGS. 4 and 5, the main display 110 moves upward (FIG. 5) or downward (FIG. 4) automatically or manually.

For example, the main display 110 moves upward in the center fascia 33 when the vehicle 10 is running and moves downward when the vehicle 10 is stopped.

Particularly, the main display 110 may move upward when the driver presses the accelerator pedal 15 and move downward when the driver presses the brake pedal 16. In addition, the main display 110 may move upward when the gear manipulation lever 41 is in the drive gear D position and move downward when the manipulation lever 41 is in the neutral gear N position or the parking gear P position.

In addition, the main display 110 may move upward when a navigation service is provided (e.g., when a navigation screen is actuated by a user's manual manipulation) and move downward when the navigation service is terminated (e.g., when the navigation screen is not actuated by a user's manual manipulation).

The main display 110 may also move upward when a driving route of the vehicle 10 is preset (e.g., when the driving route is stored in a storage unit 400 (FIG. 6)) and move downward when the driving route of the vehicle 10 is not preset.

The main display 110 may also move upward when the main display 110 is implemented using a touchscreen and displays a screen that requires a user's touch manipulation and move downward when the screen that requires the user's touch manipulation is terminated.

When the vehicle 10 includes the illumination sensor (not shown), the main display 110 may also move upward or move downward in accordance with an output value of the illumination sensor and the degree of the upward movement or downward movement may vary.

In addition, the main display 140 may immediately move upward when the driver presses the accelerator pedal 15 and move downward at a predetermined time period after the driver presses the brake pedal 16.

The main display 110 may also move upward or move downward when the user manually applies a force. In this regard, the user may set a time period required for the upward or downward movement of the main display 110 or a speed of the upward or downward movement of the main display 110.

The upward or downward movement of the main display 110 may be performed in a sliding or pop-up manner by driving a separate drive unit such as a motor and an actuator or by a user's manual manipulation. In this regard, the drive unit may be driven by an upward control signal or a downward control signal received from the controller 200 (FIG. 6).

Also, the upward movement or downward movement of the main display 110 may be determined, the speed of the upward movement or downward movement of the main display 110 may be adjusted, a timing of the upward movement or downward movement of the main display 110 may be set, and the degree of the upward movement or downward movement of the main display 110 may be controlled by using various other methods within the range of design modification which could be made by one of ordinary skill in the art.

Figure 6:
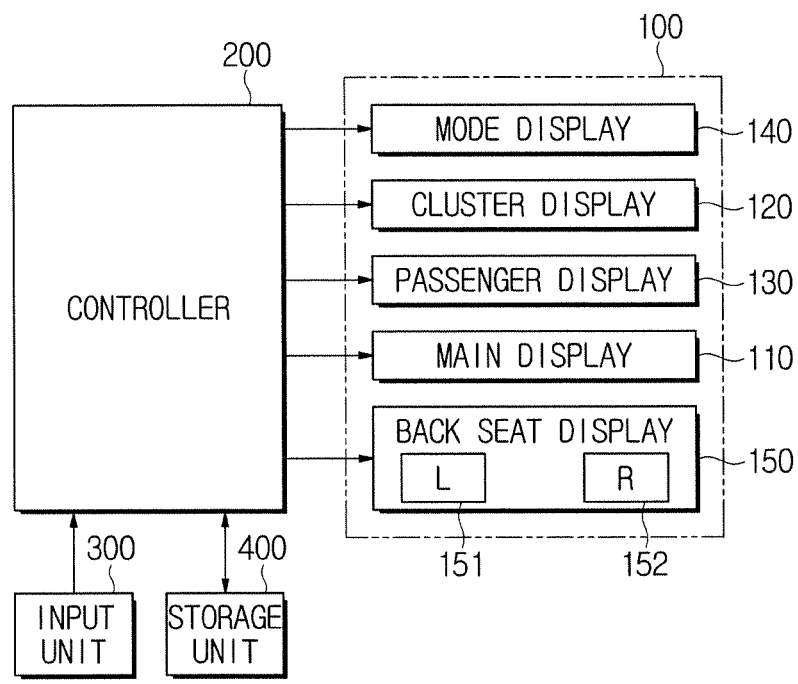
FIG. 6 is a control block diagram of a vehicle.

Referring to FIG. 6, a display device 100 including the main display 110 may operate in accordance with a control signal of the controller 200.

Although not shown herein, back seat displays 150 may further be mounted on the rear surfaces of the driver's seat 21 and the front passenger's seat 22, and the back seat displays 150 may include a left back seat display 151 (L) mounted on the rear surface of the driver's seat 21 and a right back seat display 152 (R) mounted on the rear surface of the front passenger's seat 22.

The display device 100 may include a plasma display panel (PDP), a light emitting diode (LED), a liquid crystal display (LCD), or the like.

The display device 100 may also be implemented using a three-dimensional display that displays a stereoscopic image.

The display device 100 may include a touchscreen. If the display device 100 includes a touchscreen, the display device 100 may also serve as an input unit 300. The touchscreen may be implemented using a pressure-sensitive touchscreen panel or a capacitive touchscreen panel. In addition, the touchscreen may be implemented using a touchscreen panel that uses ultrasound or infrared light.

The controller 200 controls the display device 100, for example, moves and changes the regions of the screen of the display device 100 or determines content to be displayed on the screen in accordance with pre-stored settings or a user's manipulation.

The controller 200 may include a processor, a read only memory (ROM) configured to store control programs to control the vehicle 10, and a random access memory (RAM) configured to store a signal or data input from the outside of the vehicle 10 or used as a storage corresponding to various operations performed by the vehicle 10. The controller 200 may also include a processing board, such as a graphic processing board, including a processor, a RAM, or a ROM in a separate circuit board. The processor, RAM, and ROM may be interconnected via an internal bus. The controller 200 may be used as a term indicating a constituent element including a processor, a RAM, and a ROM. The controller

200 may also be used as a term indicating a constituent element including a processor, a RAM, a ROM, and a processing board.

A manipulation to control the display device 100 may be input through the input unit 300, and the settings to control the display device 100 may be pre-stored in the storage unit 400.

The input unit 300 includes a hard key, a touchscreen, a jog dial, and a gesture recognition unit in various forms to receive a command input in accordance with the user's manipulation. The user may control each constituent element of the vehicle 10 by pressing, rotating, or touching the input unit 300 or using a predetermined gesture.

The input unit 300 may allow the user to input a control command while watching the display device 100.

The storage unit 400 may store various data, programs, or applications used to drive and control the constituent elements. The storage unit 400 may store graphic information regarding icons displayed on the display device 100, installation information related to control of the vehicle 10, and the like.

The storage unit 400 may also store control programs to control the constituent elements of the vehicle 10, specialized applications initially provided by a manufacturer, or general-purpose applications downloaded from the outside.

The storage unit 400 may include at least one storage medium selected from the group consisting of a flash memory, a hard disk drive, a memory card, a read-only memory (ROM), a random access memory (RAM), an electrically erasable programmable read-only memory (EEPROM), a programmable read-only memory (PROM), a magnetic memory, a magnetic disc, and an optical disc.

Hereinafter, control operations of the display device 100 installed in the vehicle 10 according to an embodiment will be described with reference to FIGS. 7A to 8. For descriptive convenience, the main display 110 will be described as an example of the display device 100, but the display device 100 is not limited to the main display 110.

Figure 7A:
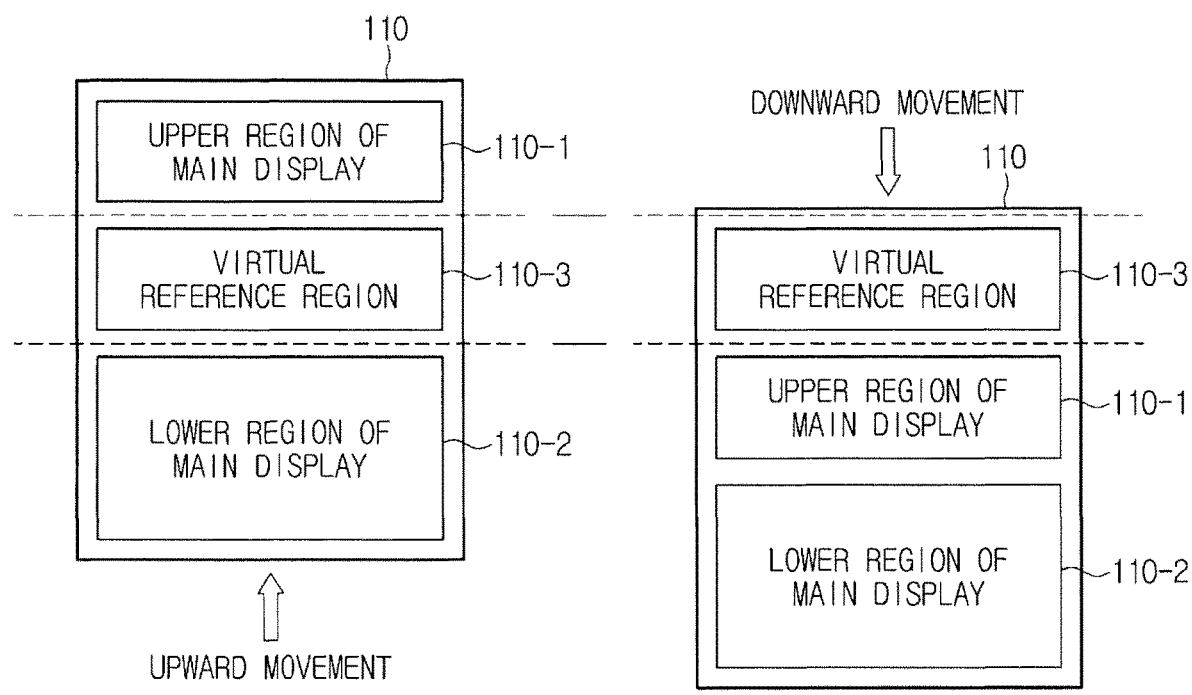
FIGS. 7A, 7B and 8 are conceptual diagrams for describing control operations when a main display moves upward or downward.
Figure 7B:
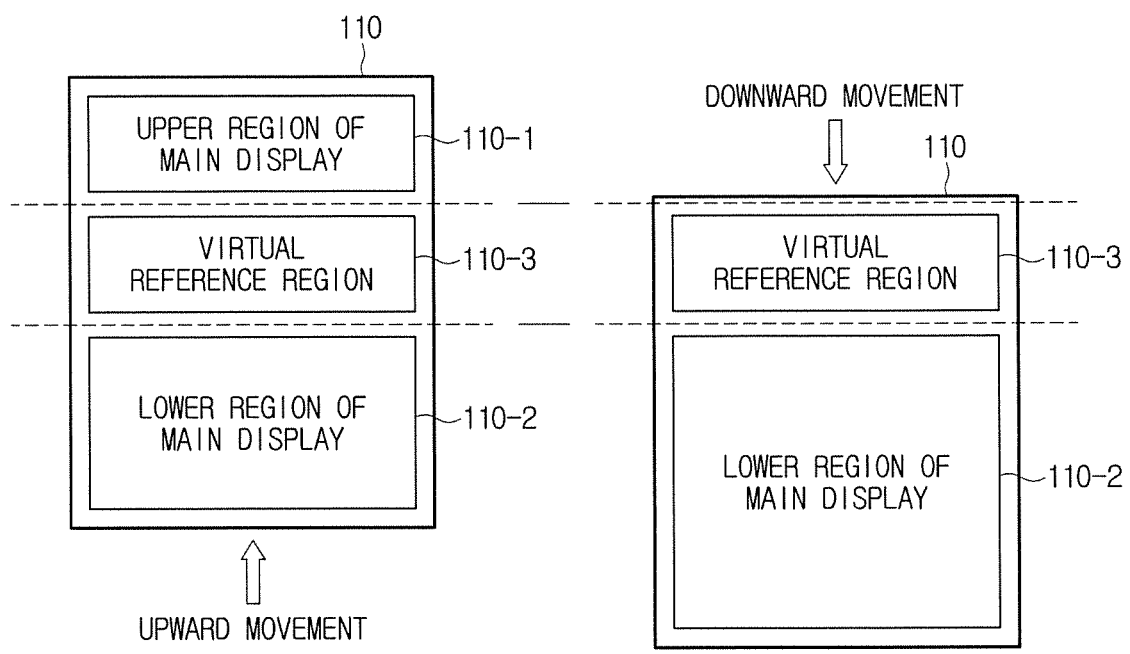
Figure 8:
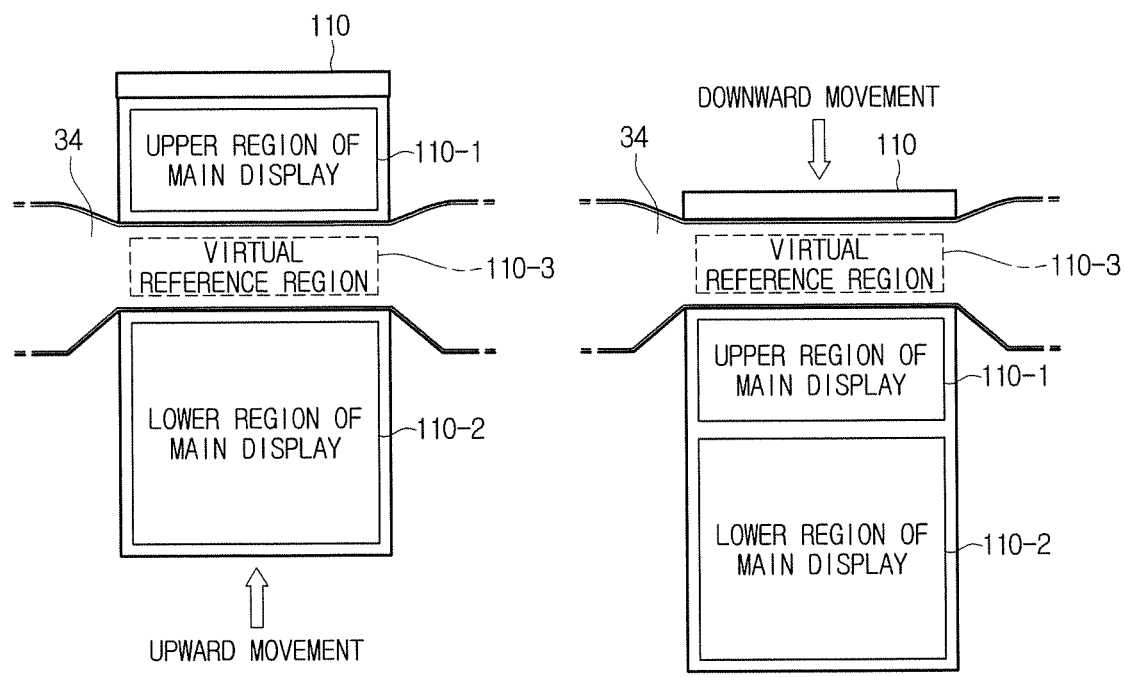

FIGS. 7A to 8 are conceptual diagrams for describing control operations when the main display 110 moves upward or downward.

Referring to FIG. 7A, the main display 110 displays contents in divided regions. When the main display 110 is in the uppermost position, a screen of the main display 110 displaying contents is divided into an upper region 110-1 and a lower region 110-2, and a predetermined line or area used to divide the screen into the upper region 110-1 and the lower region 110-2 is referred to as a virtual reference region 110-3, the virtual reference region 110-3 maintains an absolute reference position when the main display 110 moves downward. In this regard, the screen of the main display 110 displaying the contents is not necessarily divided into the upper region 110-1 and the lower region 110-2 and may also be divided into a plurality of regions. However, for descriptive convenience, the case of dividing the screen into the upper region 110-1 and the lower region 110-2 will be described by way of example.

Particularly, although the virtual reference region 110-3 maintains the absolute reference position when the main display 110 moves downward, the upper region 110-1 of the main display 110 moves to a position below the virtual reference region 110-3.

According to an embodiment, when the main display 110 moves downward in the sliding manner, the upper region 110-1 may move to the position below the virtual reference region 110-3 at the same speed as that of the downward movement of the main display 110 or gradually.

According to another embodiment, when the main display 110 moves downward in the pop-up manner, the upper region 110-1 may move to the position below the virtual reference region 110-3 immediately or after a predetermined time period.

However, when the main display 110 moves upward, the upper region 110-1 of the main display 110 moves back to a position above the virtual reference region 110-3 while the virtual reference region 110-3 maintains the absolute reference position.

According to an embodiment, when the main display 110 moves upward in the sliding manner, the upper region 110-1 may move to a position above the virtual reference region 110-3 at the same speed as that of the upward movement of the main display 110 or gradually.

According to another embodiment, when the main display 110 moves upward in the pop-up manner, the upper region 110-1 may move to a position above the virtual reference region 110-3 immediately or after a predetermined time period.

In addition, referring to FIG. 7B, when the main display 110 moves downward, the upper region 110-1 of the main display 110 is removed and the lower region 110-2 may be scaled up to the entire region below the virtual reference region 110-3 while the virtual reference region 110-3 maintains the absolute reference position.

According to an embodiment, when the main display 110 moves downward in the sliding manner, the upper region 110-1 may be scaled down at the same speed as that of the downward movement of the main display 110 and the lower region 110-2 may also be scaled up to the entire region at the same speed.

According to another embodiment, when the main display 110 moves downward in the pop-up manner, the upper region 110-1 may be removed immediately and the lower region 110-2 may be scaled up to the entire region immediately. Alternatively, the removal of the upper region 110-1 and the scaling up of the lower region 110-2 may be performed after a predetermined time period.

However, when the main display 110 moves upward, the upper region 110-1 of the main display 110 may appear at the position above the virtual reference region 110-3 and the lower region 110-2 may be scaled down while the virtual reference region 110-3 maintains the absolute reference position.

According to an embodiment, when the main display 110 moves upward in the sliding manner, the upper region 110-1 may appear and be scaled up at the position above the virtual reference region 110-3 at the same speed as that of the upward movement of the main display 110 and the lower region 110-2 may also be scaled down at the same speed.

According to another embodiment, when the main display 110 moves upward in the pop-up manner, the upper region 110-1 may appear immediately and the lower region 110-2 may be scaled down immediately. Alternatively, the appearance of the upper region 110-1 and the scaling down of the lower region 110-2 may be performed after a predetermined time period.

Content frequently used by the user such as the emergency lamps 91 and 92, icons to control the air conditioner, or a clock may be displayed in the virtual reference region 110-3.

Meanwhile, the vehicle 10 may include the mode region 34 of the dashboard extending from the dashboard disposed in front of the driver's seat 21 and the front passenger's seat 22 to be spaced apart from a front surface of the virtual reference region 110-3 of the main display 110. That is, the virtual reference region 110-3 may be a region of the screen of the main display 110 screened by the mode region 34.

In this case, referring to FIG. 8, when the main display 110 moves downward, the virtual reference region 110-3 also maintains the absolute reference position. Particularly, when the main display 110 moves downward, the virtual reference region 110-3 maintains the absolute reference position, while the upper region 110-1 of the main display 110 moves to the position below the virtual reference region 110-3 or is removed. On the contrary, when the main display 110 moves upward, the upper region 110-1 of the main display 110 moves back to the position above the virtual reference region 110-3 or appears at the position above the virtual reference region 110-3 while the virtual reference region 110-3 maintains the absolute reference position.

The mode region 34 may be mounted with the mode display 140 that displays various contents and may be provided with various input units 300, such as a hard key, a jog dial, and a gesture recognition unit, to receive a command in accordance with the user's manipulation.

In this case, the mode region 34 may be provided with a hard key frequently used by the user, or the mode display 140 may display content frequently used by the user.

Although not shown herein, when the mode region 34 has a recess at a portion screening the virtual reference region 110-3, the recess of the mode region 34 may transmit the contents displayed in the virtual reference region 110-3 of the main display 110.

Figure 9A:
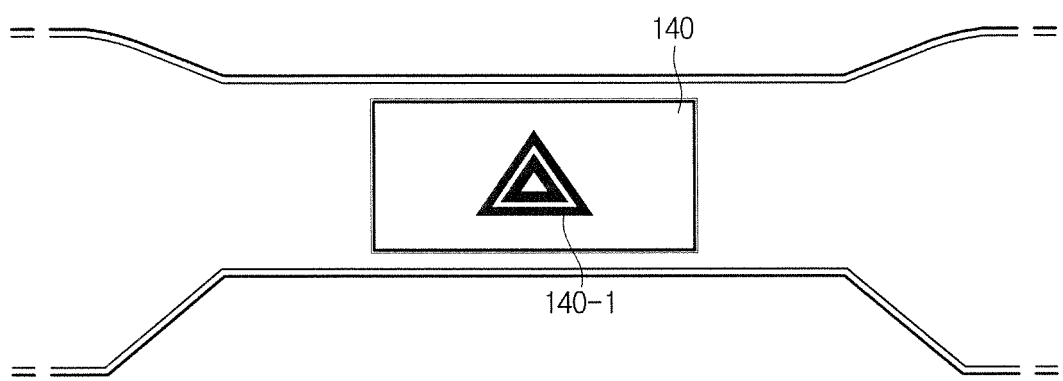
FIGS. 9A, 9B and 9C are diagrams exemplarily illustrating a mode display changed in accordance with an upward or downward movement of a main display.
Figure 9B:
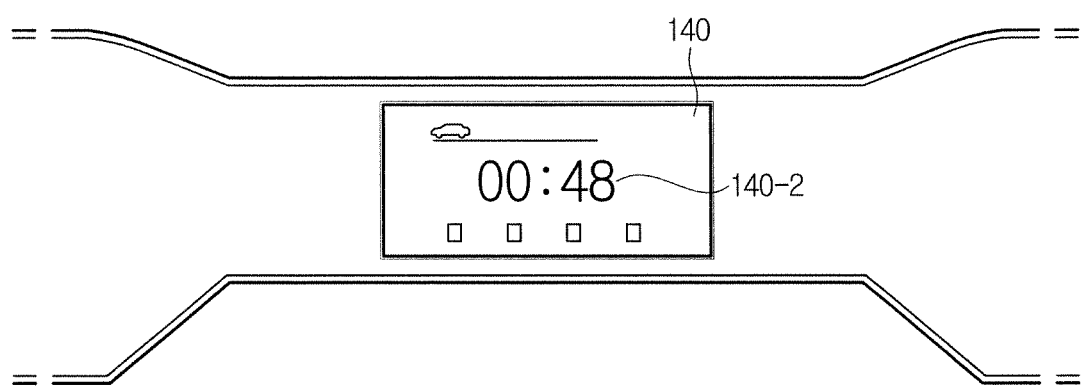
Figure 9C:
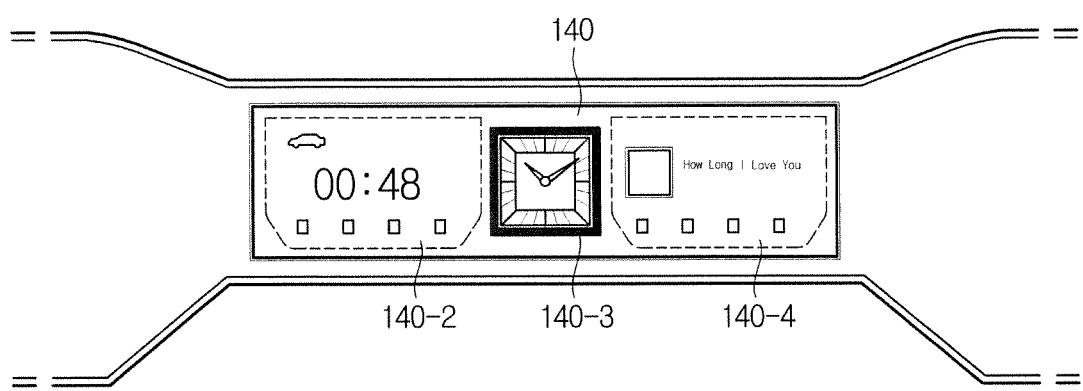

Meanwhile, according to another embodiment, when the mode display 140 is mounted on the mode region 34, content displayed on the mode display 140 may be changed in accordance with the upward or downward movement of the main display 110. FIGS. 9A to 9C are diagrams exemplarily illustrating the mode display 140 changed in accordance with the upward or downward movement of the main display 110.

Referring to FIG. 9A, when the main display 110 moves downward, the mode display 140 may display an emergency lamp control icon 140-1.

For example, when the main display 110 moves downward, the user may turn on or off the emergency lamps 91 and 92 of the vehicle 10 by touching the emergency lamp control icon 140-1 displayed on the mode display 140.

Also, referring to FIG. 9B, the mode display 140 may display information required for the driving of the vehicle 10 when the main display 110 moves upward.

For example, when the main display 110 moves upward, the mode display 140 may provide the user with information required for the driving the vehicle 10 by displaying driving time 140-2 of the vehicle 10, a seat belt wearing status, an oiling status, a pressing status of the brake pedal 16, an opening status of the doors 71 and 72, and the like.

Also, referring to FIG. 9C, when the main display 110 moves upward, the mode display 140 may display the information illustrated in FIG. 9B such as the driving time 140-2, current time 140-3, and a screen displaying a music playback icon and an air conditioner control icon 140-4.

Meanwhile, the mode display 140 may display a variety of information in accordance with the upward or downward movement of the main display 110, and the displayed information is not limited to the examples illustrated in FIGS. 9A to 9C.

Also, when the mode region 34 on which the mode display 140 is mounted has a recess at a portion and the mode display 140 has a transparent display at the recess, the mode display 140 may transmit the contents of the screened virtual reference region 110-3 of the main display 110.

According to another embodiment, the content displayed on the main display 110 may also vary in accordance with the upward or downward movement of the main display 110.

Hereinafter, content displayed on the main display 110 respectively in the upper region 110-1 and the lower region 110-2 will be described with reference to FIGS. 10 to 19.

For descriptive convenience, the main display 110 will be described as an example of the display device 100. However, the display device 100 is not limited to the main display 110 and any other display devices may also be used therefor. Furthermore, a description will be given of the case in which the vehicle 10 includes the mode region 34 illustrated in FIG. 8 and the mode region 34 is mounted with the mode display 140 that displays the emergency lamp control icon 140-1 illustrated in FIG. 9A for descriptive convenience. In this case, the virtual reference region 110-3 of the main display 110 is disposed at the back of the mode region 34.

FIGS. 10 to 15 are diagrams for exemplarily describing content displayed when the main display moves downward.

When the main display 110 moves downward, the upper region 110-1 of the main display 110 may display a list of applications. FIGS. 10 to 15 illustrate examples of the list of applications, and the list of applications is not limited thereto.

Although the upper region 110-1 of the main display 110 may also display other content in addition to the list of application, the case in which the list of applications is displayed will be described for descriptive convenience.

Figure 10:
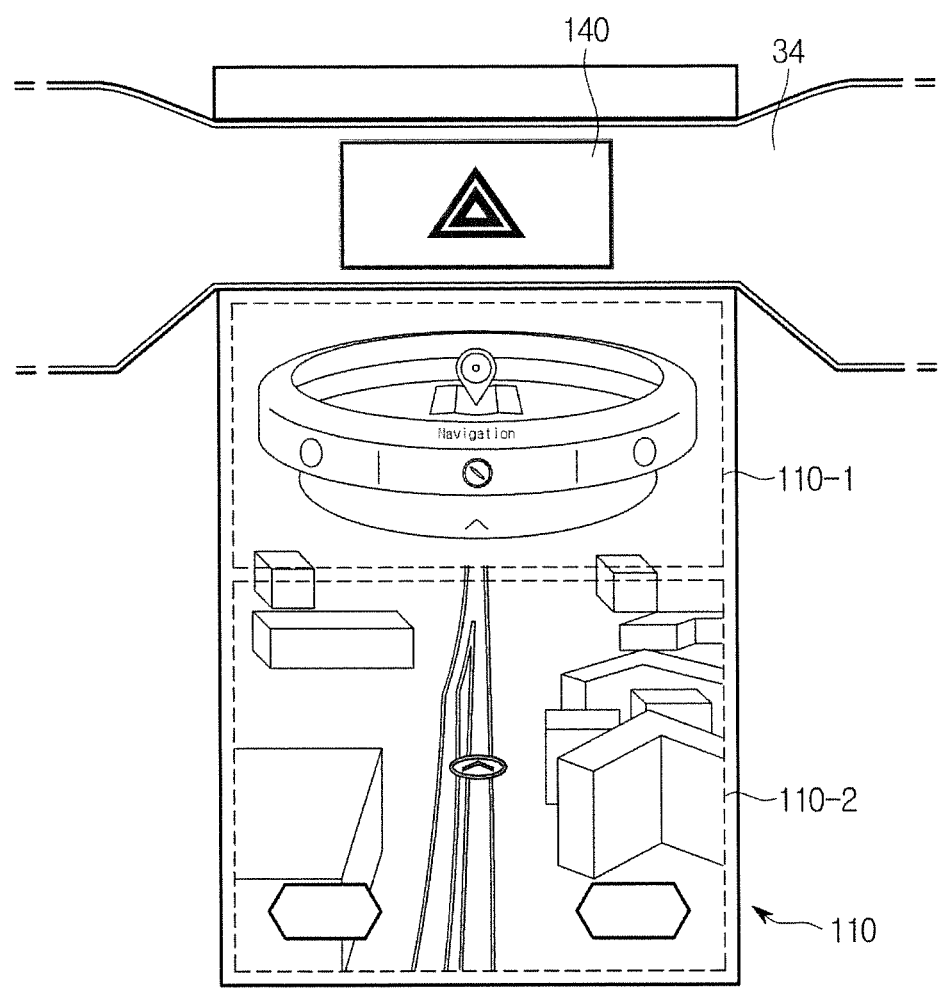
FIGS. 10 to 15 are diagrams for exemplarily describing content displayed when a main display moves downward.

Referring to FIG. 10, when a Navigation icon is selected by a user's manipulation among icons displayed in the upper region 110-1 of the main display 110, a navigation screen providing a navigation service may be displayed in the lower region 110-2 of the main display 110.

The navigation screen may display a current location of the vehicle 10, a destination, a distance remaining to the destination, remaining time to the destination, a heading direction of the vehicle 10, and a driving route to the destination, without being limited thereto.

Figure 11:
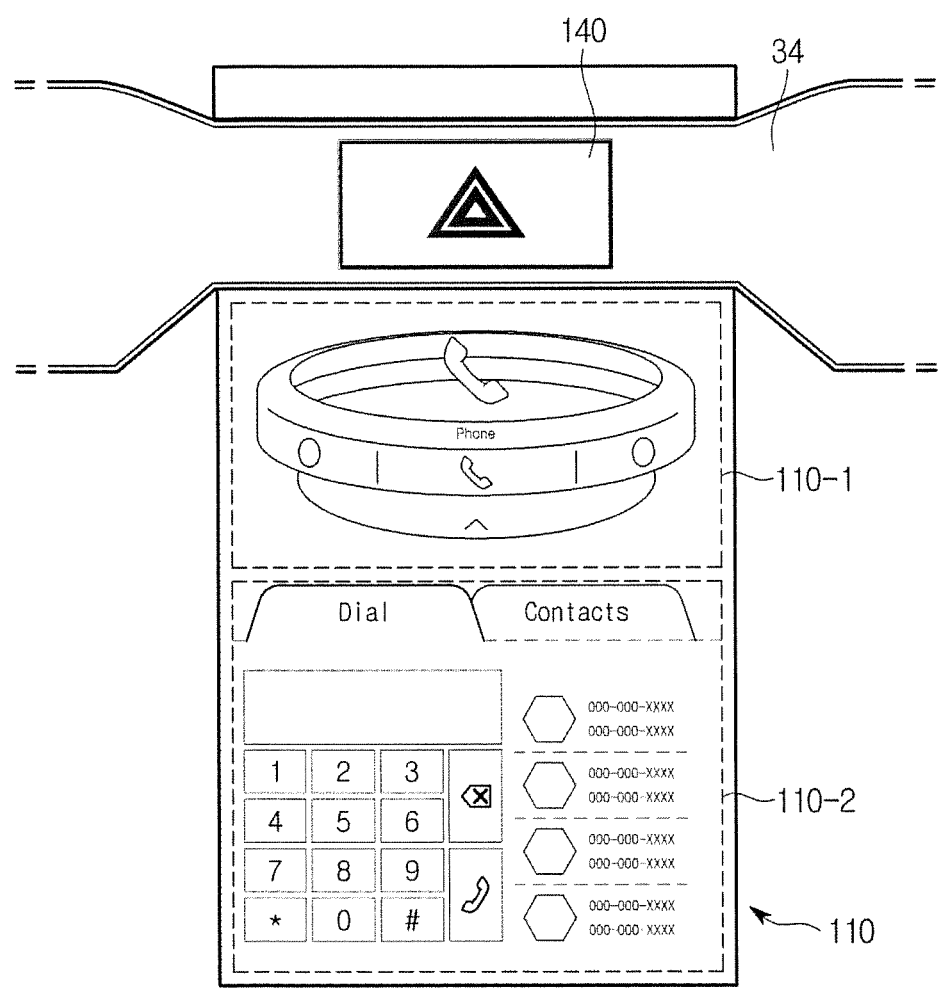

Referring to FIG. 11, when a Phone icon is selected by a user's manipulation among the icons displayed in the upper region 110-1 of the main display 110, a phone screen providing a phone service may be displayed in the lower region 110-2 of the main display 110.

The phone screen may display dial buttons, recent calls, and a call button, without being limited thereto.

Figure 12:
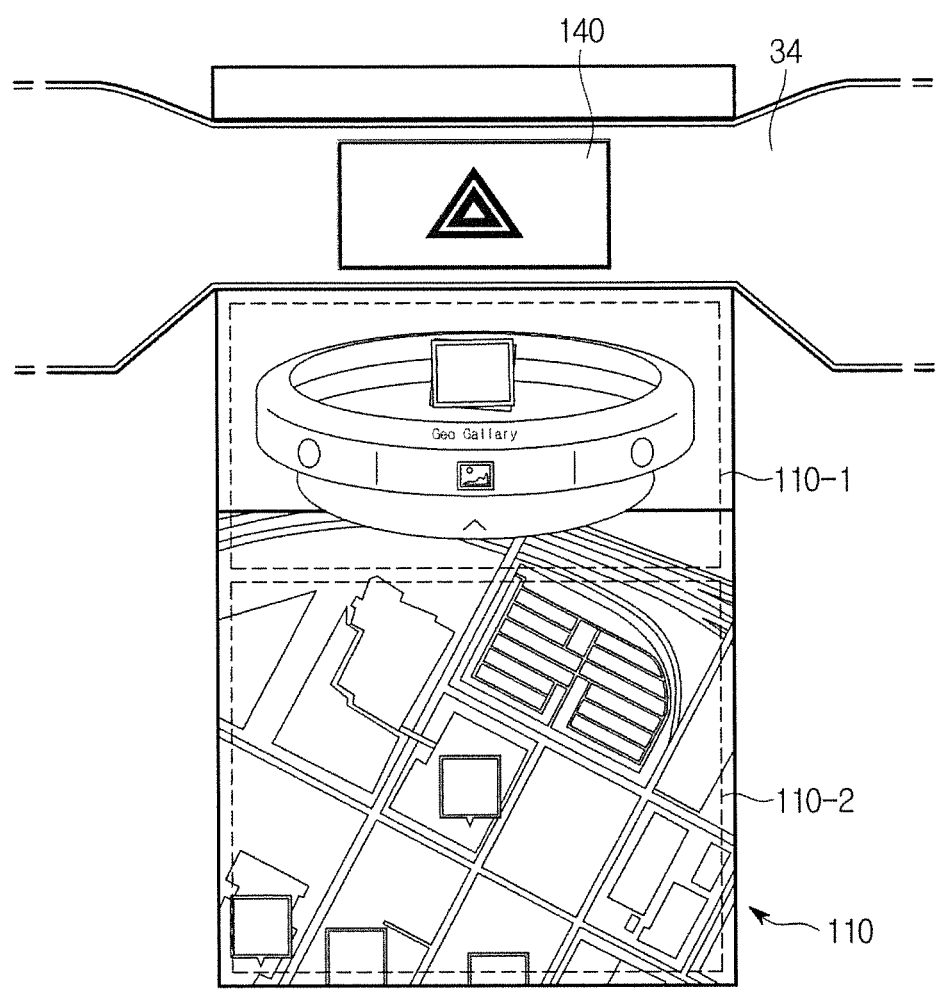

Referring to FIG. 12, when a Geo Gallery icon is selected by a user's manipulation among the icons displayed in the upper region 110-1 of the main display 110, map information and a photograph icon providing photographs acquired at each point included in the map information may be displayed in the lower region 110-2 of the main display 110.

The lower region 110-2 of the main display 110 may display photographs acquired by the user at each point included in the map information when the user clicks the photograph icon.

The photographs may be images taken directly by a camera module (not shown) of the vehicle 10 or images acquired by a mobile terminal (not shown).

Figure 13:
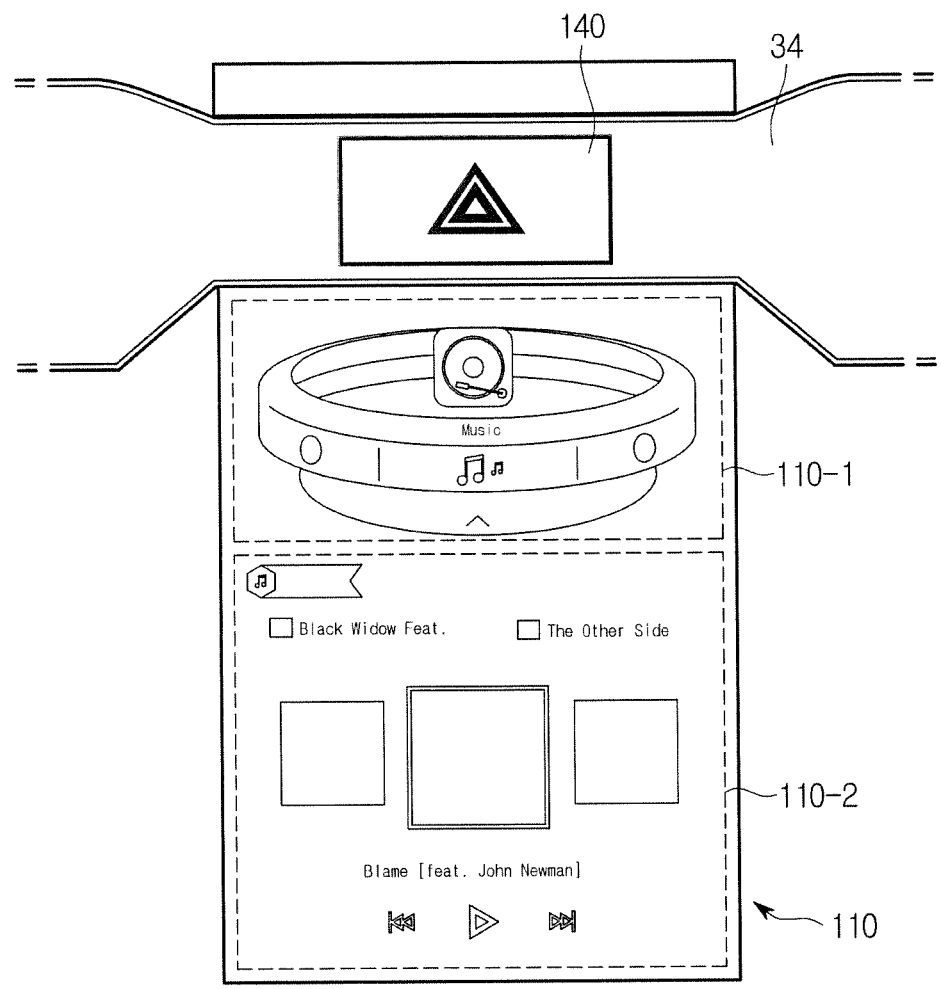

Referring to FIG. 13, when a Music icon is selected by a user's manipulation among the icons displayed in the upper region 110-1 of the main display, a music screen providing an audio service may be displayed in the lower region 110-2 of the main display 110.

The music screen may display song title information, artist information, and a replay icon, without being limited thereto.

Figure 14:
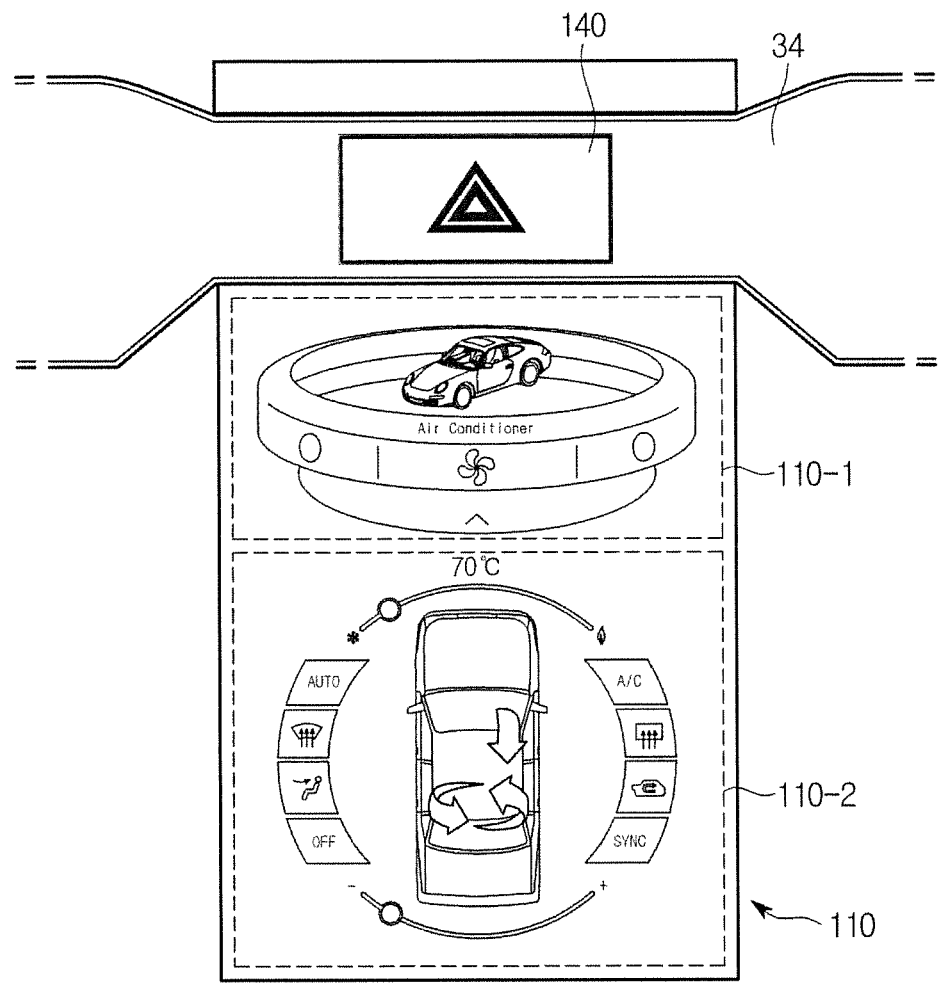

Referring to FIG. 14, when an Air Conditioner icon is selected by a user's manipulation among the icons displayed in the upper region 110-1 of the main display 110, an air conditioner control screen to control the air conditioner of the vehicle 10 may be displayed in the lower region 110-2 of the main display 110.

The air conditioner control screen may display an icon for controlling an airflow direction of the air conditioner, an icon for internal air circulation only, a cooler driving icon, a temperature control button, and the like. Since the icons used to control the air conditioner are well known in the art, detailed descriptions thereof will not be given herein.

As described above, when the main display 110 moves downward, the list of applications may be displayed in the upper region 110-1 of the main display 110 and the service providing screen corresponding to an icon selected by the user may be displayed in the lower region 110-2 of the main display 110. However, the contents provided by the main display 110 are not limited to the list of applications and the service providing screens illustrated in FIGS. 10 to 14. Besides, other content may also be displayed in the upper region 110-1 of the main display 110 and the lower region 110-2 of the main display 110.

Figure 15:
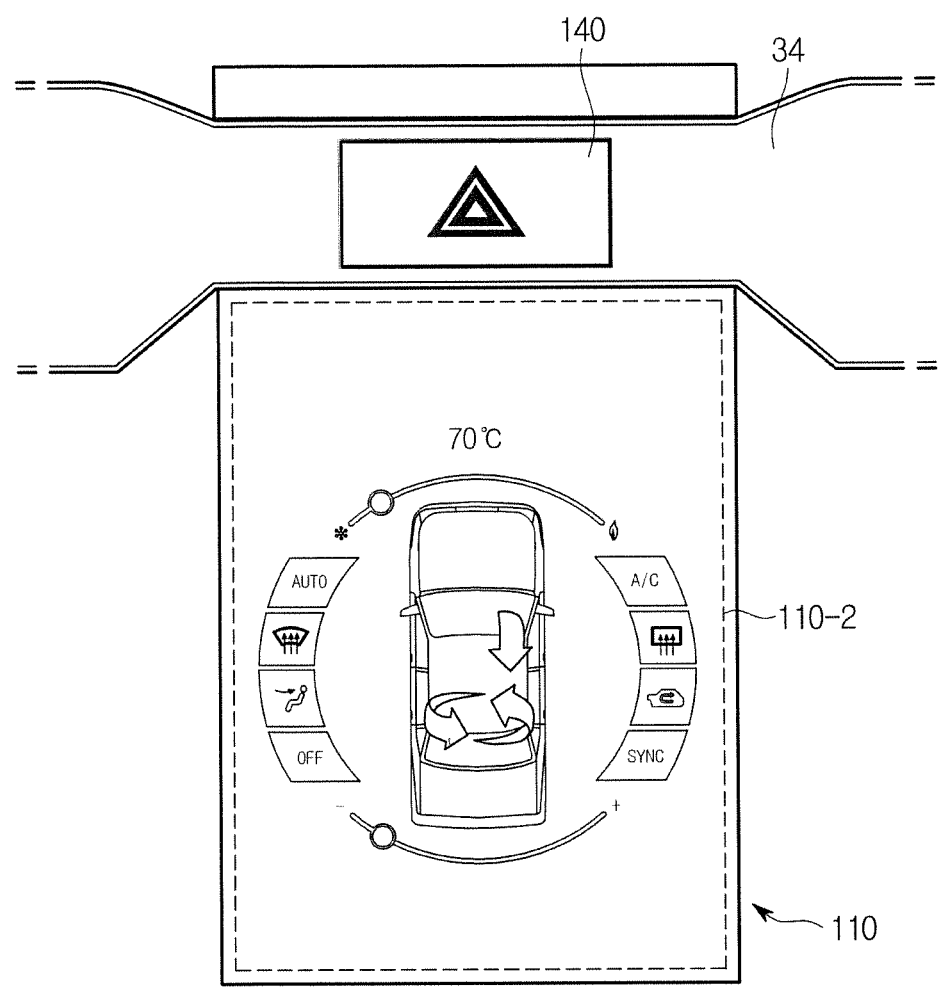

In addition, referring to FIG. 15, when the main display 110 moves downward, the upper region 110-1 of the main display 110 may be scaled down, and the lower region 110-2 may be scaled up to the entire region below the virtual reference region 110-3 automatically or manually.

FIGS. 16 to 19 are diagrams for exemplarily describing content displayed when the main display moves upward.

When the main display 110 moves upward, information required for ordinary driving of the vehicle 10 may be displayed in the upper region 110-1 of the main display 110. For example, content related to driving and safety such as a navigation screen, driving-related information, images acquired by an external camera, and around views providing front views, rear views, and side views acquired by camera modules mounted on the vehicle 10 may be displayed in the upper region 110-1 of the main display 110.

FIGS. 16 to 19 illustrate a navigation screen displayed in the upper region 110-1 of the main display 110 by way of example. In addition to the navigation screen, content such as safe driving information (e.g., sensing information about side blind spots and information about distance between vehicles) may be displayed in the upper region 110-1 of the main display 110.

Figure 16:
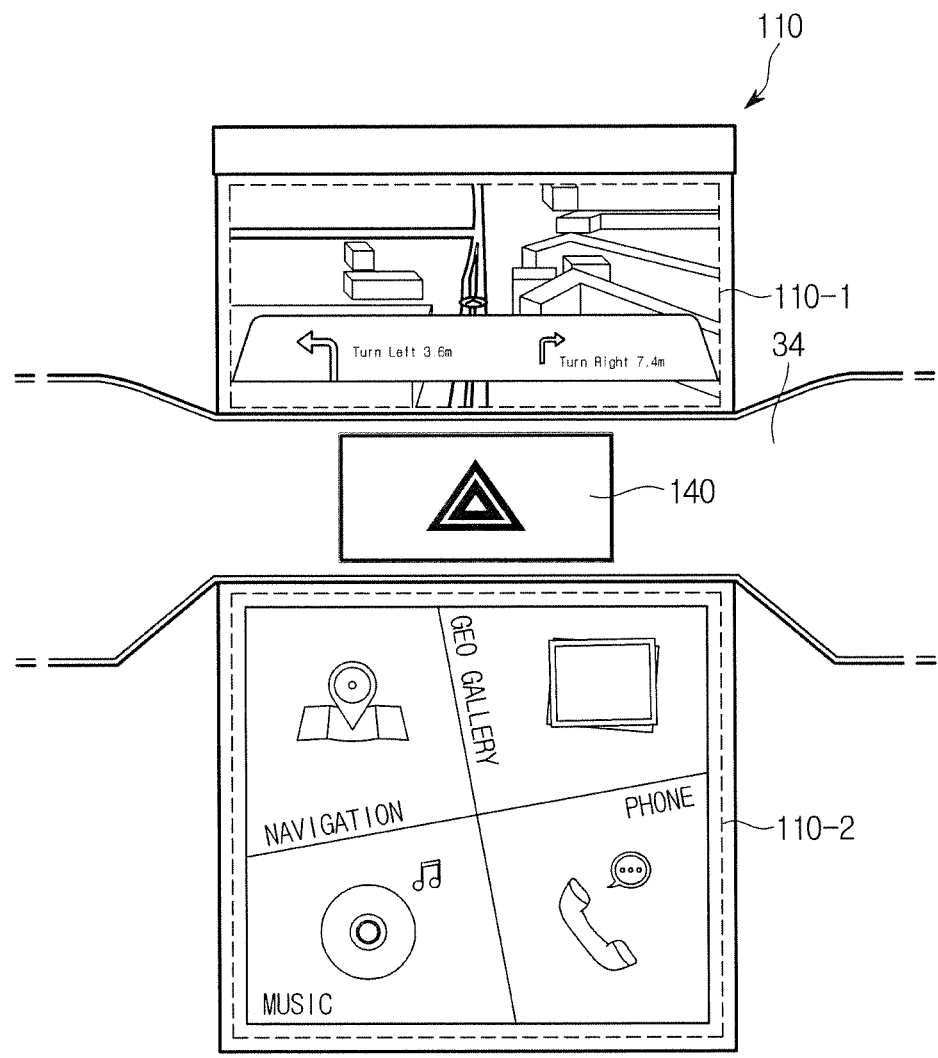
FIGS. 16 to 19 are diagrams for exemplarily describing content displayed when a main display moves upward.

Referring to FIG. 16, when the main display 110 moves upward, a list of applications, as content manipulatable by touching, may be displayed in the lower region 110-2 of the main display 110.

FIG. 16 illustrates an example of the list of applications without being limited thereto.

Figure 17:
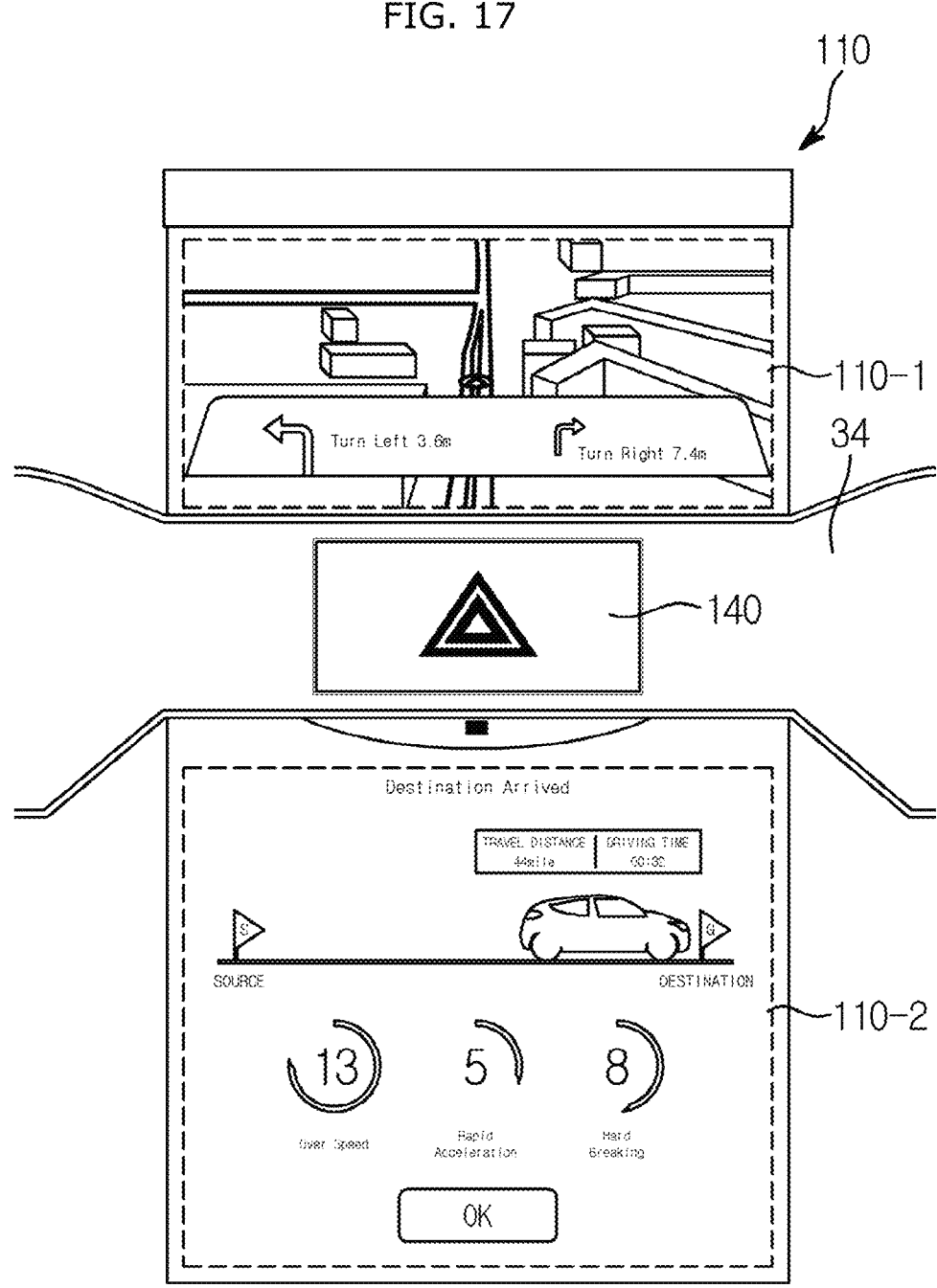

Referring to FIG. 17, when a Navigation icon is selected by a user's manipulation, navigation information required by the user may be displayed in the lower region 110-2 of the main display 110 in addition to the information provided by the upper region 110-1 of the main display 110.

For example, information about travel distance, driving time, source, destination, and the like may be displayed in the lower region 110-2 of the main display 110, without being limited thereto.

Figure 18:
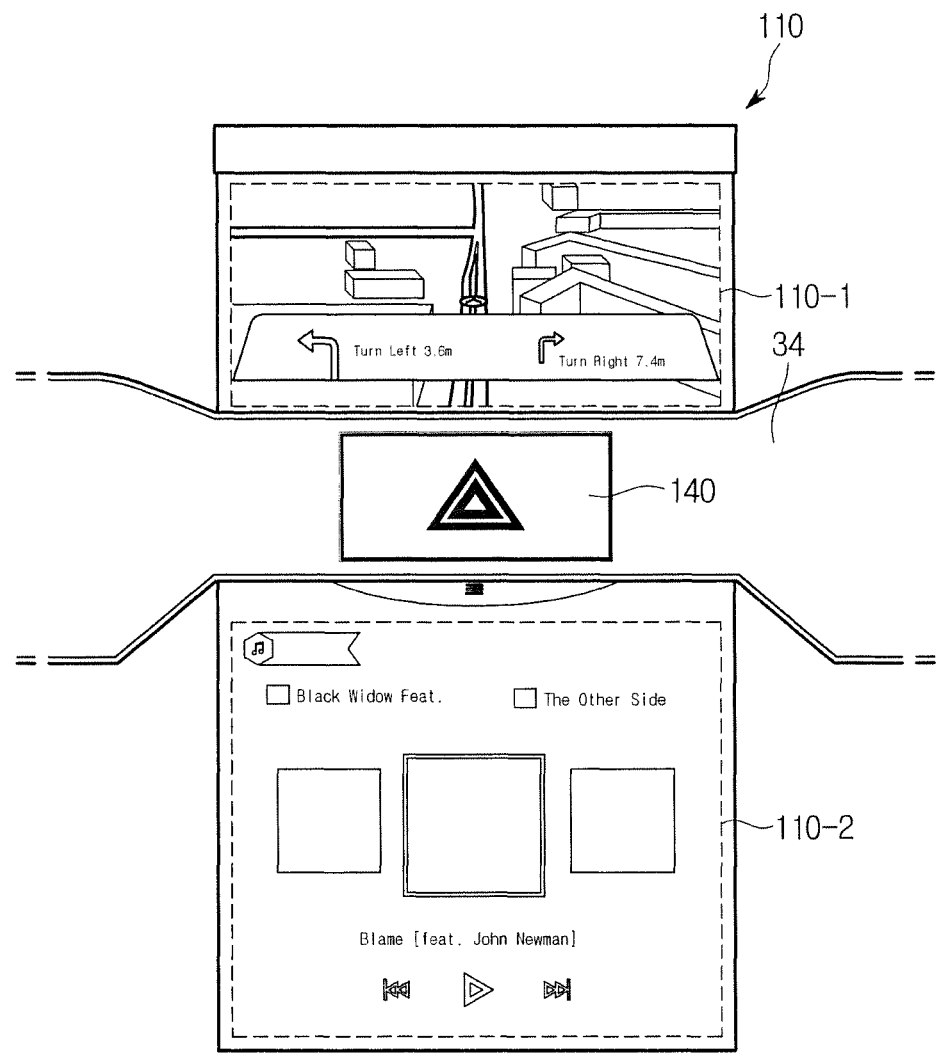

Referring to FIG. 18, when a Music icon is selected by a user's manipulation, a music screen providing an audio service may be displayed in the lower region 110-2 of the main display 110.

The music screen may display song title information, artist information, and a replay icon, without being limited thereto.

Figure 19:
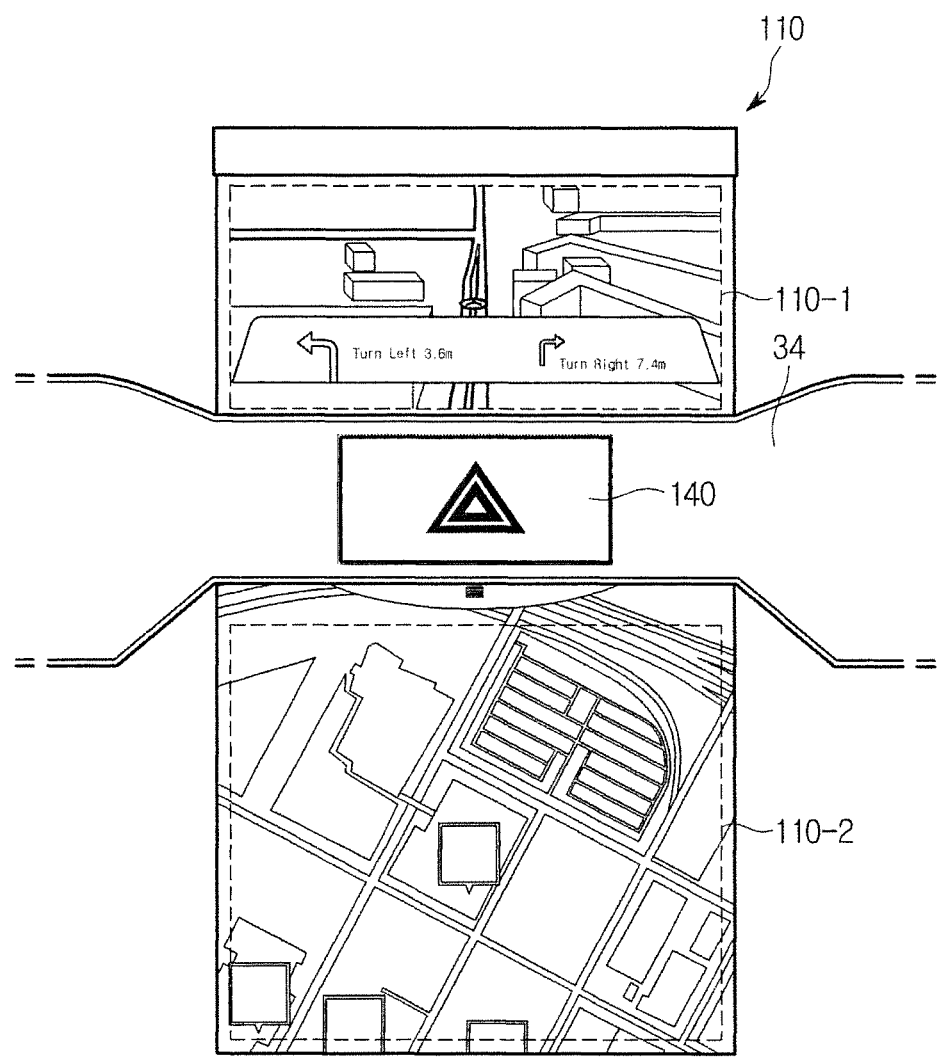

Referring to FIG. 19, when a Geo Gallery icon is selected by a user's manipulation, map information and a photograph icon providing photographs acquired at each point included in the map information may be displayed in the lower region 110-2 of the main display 110.

The lower region 110-2 of the main display 110 may display photographs acquired by the user at each point included in the map information when the user clicks the photograph icon.

The photographs may be images taken directly by a camera module (not shown) of the vehicle 10 or images acquired by a mobile terminal (not shown).

Meanwhile, the content provided by the upper region 110-1 and the lower region 110-2 of the main display 110 when the main display 110 moves upward are not limited to those illustrated in FIGS. 16 to 19.

In addition, when the main display 110 moves upward or downward, content displayed in the upper region 110-1 of the main display 110 and the lower region 110-2 of the main display 110 are immediately changed and the upper region 110-1 of the main display 110 immediately moves. Also, the contents are changed and the upper region 110-1 may move at a predetermined content expression timing. In this case, the user may set the content expression timing through the input unit 300.

Alternatively, in a state where the main display 110 moves upward or downward, the user may change content displayed in the upper region 110-1 of the main display 110 and the lower region 110-2 of the main display 110 and may move the upper region 110-1 of the main display 110 by using a gesture.

Hereinafter, a method of changing content displayed in the main display 110 by a gesture of the user will be described with reference to FIGS. 20 and 21.

Figure 20:
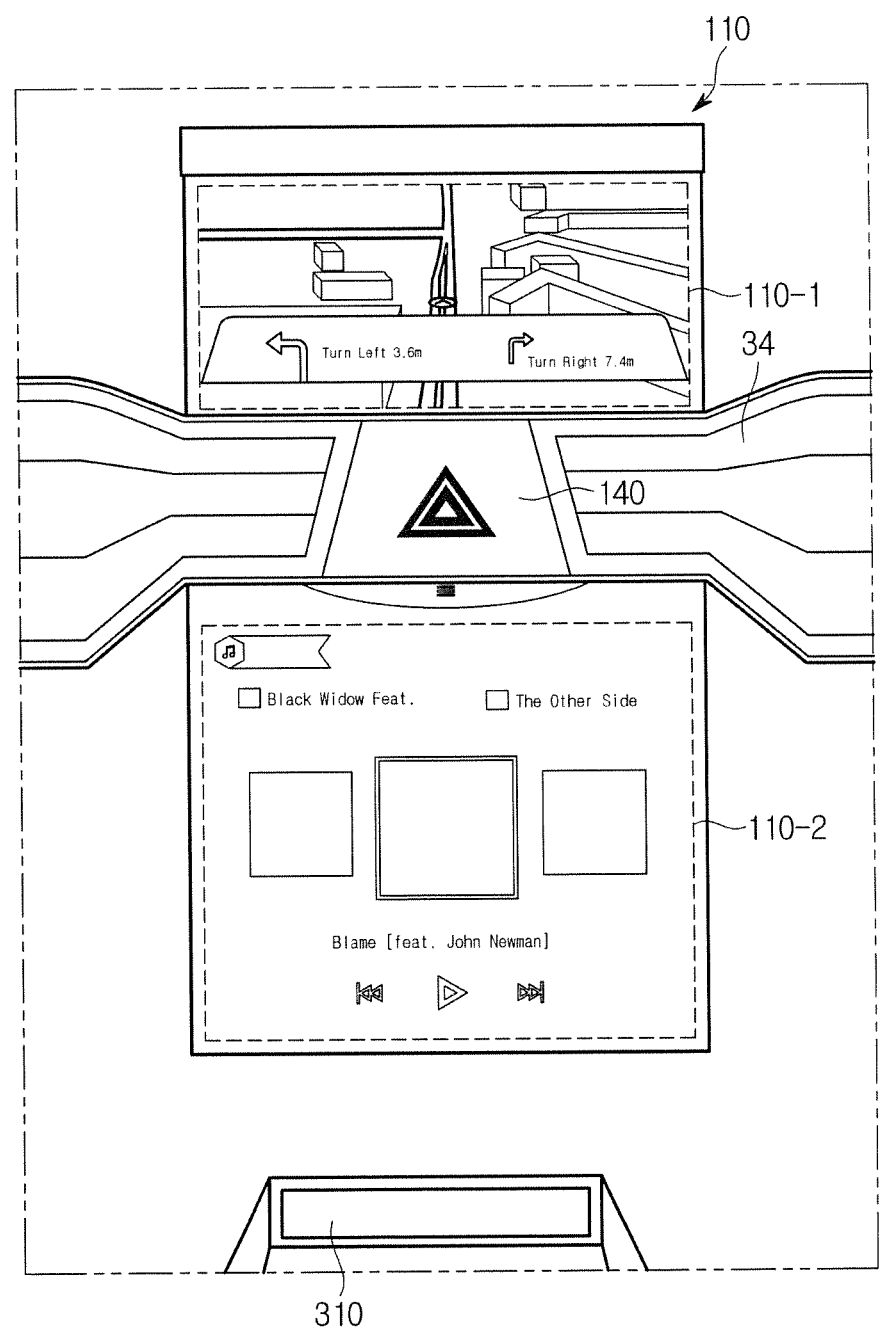
FIG. 20 is a view of a vehicle including a gesture sensing unit.

FIG. 20 is a view of a vehicle including a gesture sensing unit. FIG. 21 is a diagram illustrating contents displayed in a lower region of a main display in accordance with a gesture of a user.

Referring to FIG. 20, a gesture sensing unit 310 configured to sense a gesture of a user may be mounted below the main display 110 for easy detection of a hand gesture of the user. However, the gesture sensing unit 310 may also be mounted on the front glass 31 or around the gear manipulation lever 41 as well as below the main display 110, and the installation position is not limited thereto.

Figure 21:
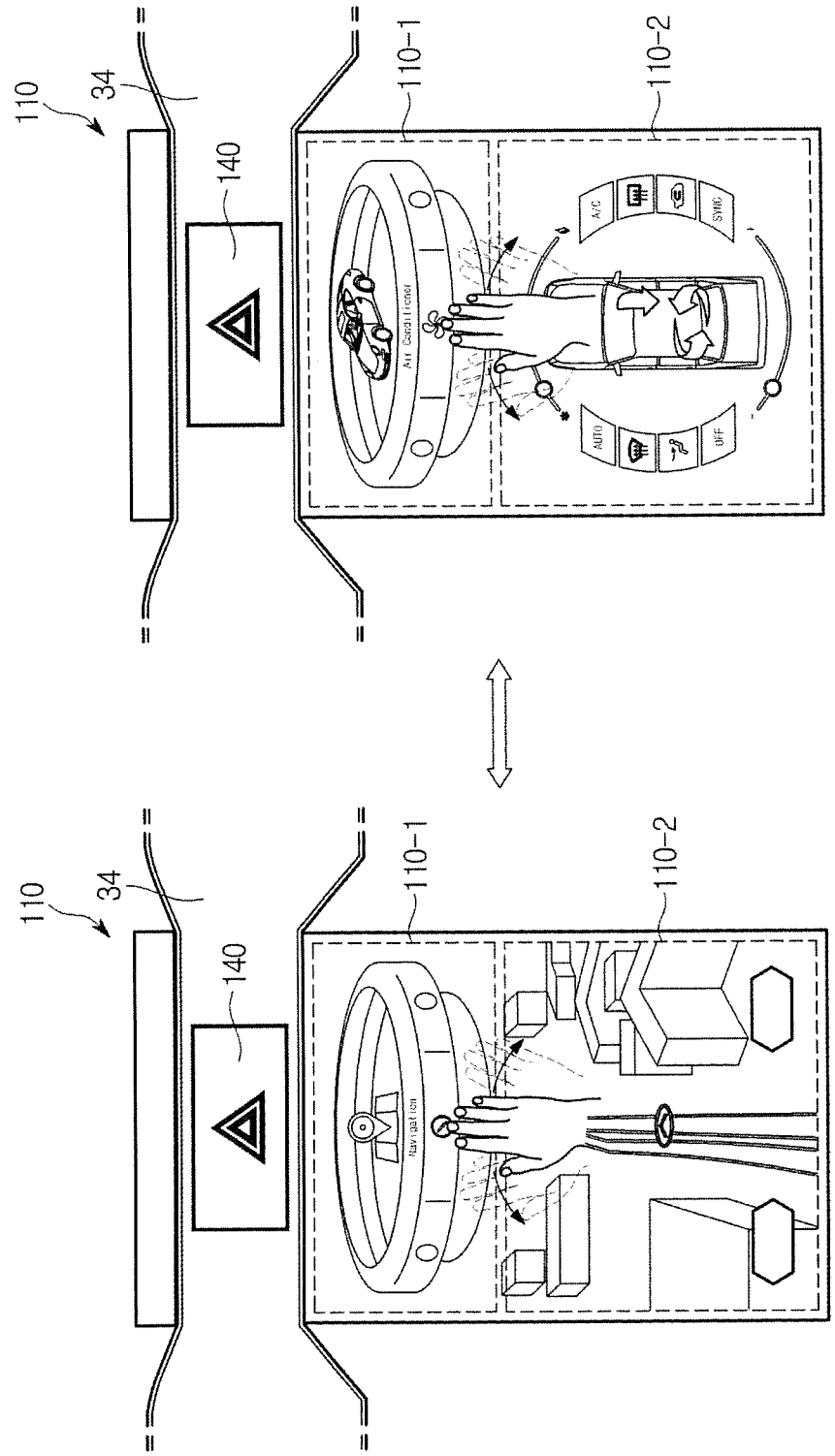
FIG. 21 is a diagram illustrating contents displayed in a lower region of a main display in accordance with a gesture of a user.

For example, referring to FIG. 21, when the list of applications is displayed in the upper region 110-1 of the main display 110 in a state that the main display 110 moves downward, one of the icons may be selected by a hand gesture of the user (e.g., lateral movement) and content corresponding to the selected icon may be displayed in the lower region 110-2 of the main display 110.

The gesture sensing unit 310 may include a Leap Motion sensor.

Besides, the user may change the content displayed in the upper region 110-1 of the main display 110 and the lower region 110-2 of the main display 110 by using voice recognition, hard key manipulation, touch manipulation, or the like and may move the upper region 110-1 of the main display 110 upward or downward, and the input unit is not limited thereto.

Figure 22:
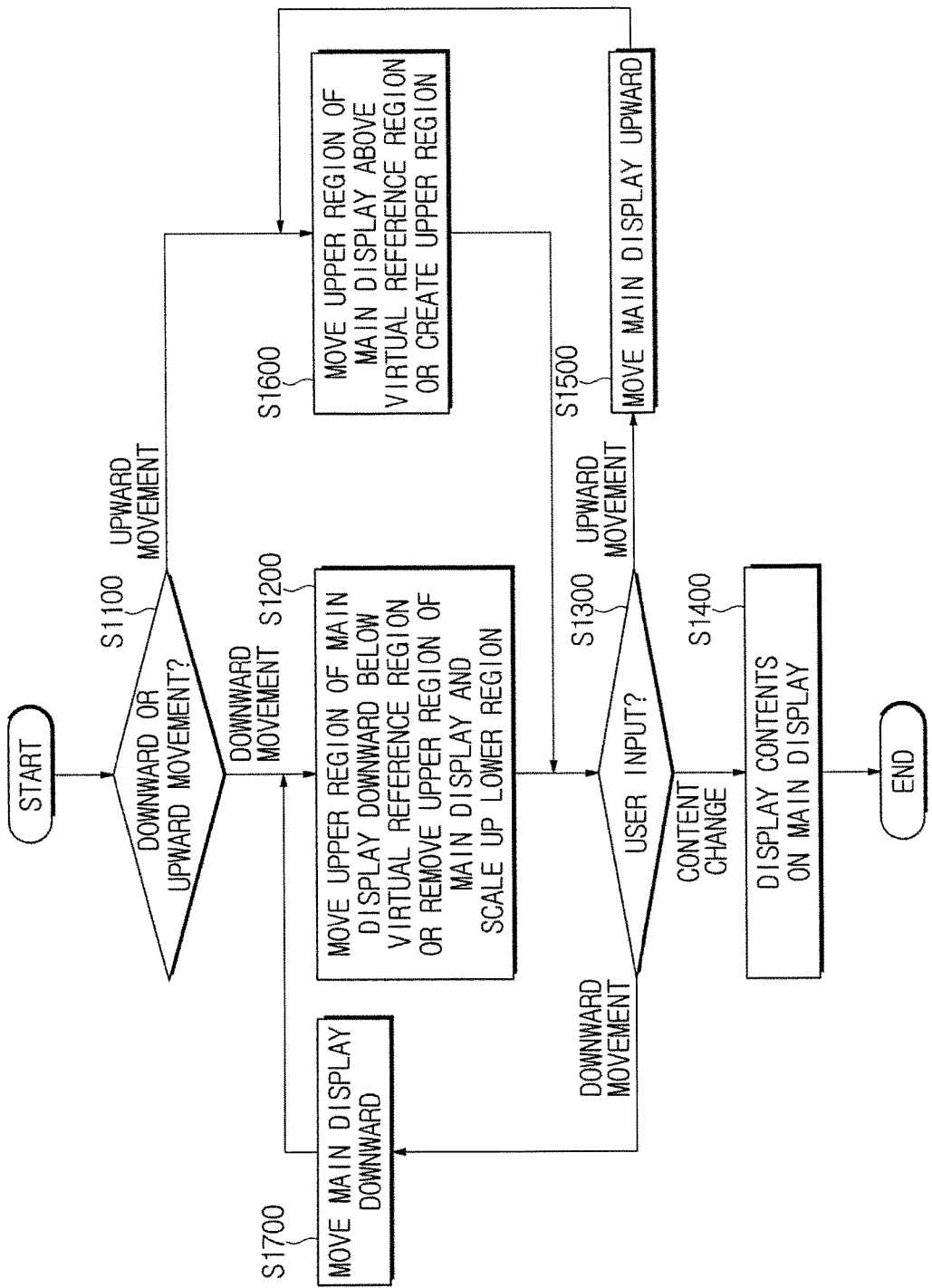
FIG. 22 is a flowchart for describing a method of controlling a vehicle.

Hereinafter, a method of controlling the vehicle 10 including the main display 110, as the display device 100, will be described with reference to FIG. 22. FIG. 22 is a flowchart for describing the method of controlling the vehicle 10.

First, the controller 200 of the vehicle 10 determines whether the main display 110 is moving upward or downward (S1100). The upward movement or downward movement of the main display 110 may be determined by a sensor to sense a position of the main display 110, an upward control signal of the main display 110 stored in the storage unit 400, a state of the gear manipulation lever 41, or manipulation of the accelerator pedal 15 or the brake pedal 16.

Then, when the main display 110 moves downward, ("downward movement" of S1100), the controller 200 moves the upper region 110-1 of the main display 110 to a position below the virtual reference region 110-3 or scales up the lower region 110-2 of the main display 110 such that content to be displayed in the lower region 110-2 of the main display 110 is displayed below the virtual reference region 110-3 (S1200).

In this case, the controller 200 may change the content to be displayed in the upper region 110-1 or the lower region 110-2 of the main display 110 (S1520).

When the lower region 110-2 of the main display 110 is scaled up, the upper region 110-1 of the main display 110 is scaled down or removed.

According to an embodiment, when content is also displayed in the virtual reference region 110-3, the controller 200 may change the content displayed in the virtual reference region 110-3 of the main display 110 in the downward movement.

According to another embodiment, when the mode region 34 is disposed to be spaced apart from the front surface of the main display 110 and the mode display 140 is installed in the mode region 34, the controller 200 may change content displayed on the mode display 140 in the downward movement. The contents displayed on the mode display 140 when the main display 110 moves upward are described above with reference to FIGS. 9A to 9C, and descriptions thereof will not be given herein.

Then, when a user's manipulation to change content is input ("content change" of S1300), the controller 200 changes the content displayed in the upper region 110-1 or the lower region 110-2 of the main display 110 (S1400).

According to an embodiment, when the virtual reference region 110-3 also displays content, the controller 200 may change the content displayed in the virtual reference region 110-3 of the main display 110 in accordance with a user's input.

According to another embodiment, when the mode region 34 is disposed to be spaced apart from the front surface of the main display 110 and the mode display 140 is installed in the mode region 34, the controller 200 may also change content displayed on the mode display 140 in accordance with a user's input. The contents displayed on the mode display 140 when the main display 110 moves downward are described above with reference to FIGS. 9A to 9C, and descriptions thereof will not be given herein.

Meanwhile, when a user's manipulation for the upward movement is input ("upward movement" of S1300), the controller 200 moves the main display 110 upward (S1500). The upward movement of the main display 110 may be performed by transmitting an upward control signal to a separate drive unit such as a motor and an actuator.

Then, when the main display 110 moves upward ("upward movement" of S1100 or after S1500), the controller 200 moves the upper region 110-1 of the main display 110 upward or scales down the lower region 110-2 (S1600).

In this case, the controller 200 may change content to be displayed in the upper region 110-1 or the lower region 110-2 of the main display 110.

When the lower region 110-2 of the main display 110 is scaled down, the controller 200 creates the upper region 110-1 above the virtual reference region 110-3.

According to an embodiment, when the virtual reference region 110-3 also displays content, the controller 200 may change the content displayed in the virtual reference region 110-3 of the main display 110 in the upward movement.

According to another embodiment, when the mode region 34 is disposed to be spaced apart from the front surface of the main display 110 and the mode display 140 is installed in the mode region 34, the controller 200 may change content displayed on the mode display 140 in the upward movement. The contents displayed on the mode display 140 when the main display 110 moves upward are described above with reference to FIGS. 9A to 9C, and descriptions thereof will not be given herein.

Then, when a user's manipulation to change content is input from the user ("content change" of S1300), the controller 200 changes the content displayed in the upper region 110-1 or the lower region 110-2 of the main display 110 (S1400).

In this case, according to an embodiment, when the virtual reference region 110-3 also displays content, the controller 200 may change the content displayed in the virtual reference region 110-3 of the main display 110 in accordance with a user's input.

According to another embodiment, when the mode region 34 is disposed to be spaced apart from the front surface of the main display 110 and the mode display 140 is installed in the mode region 34, the controller 200 may also change content displayed on the mode display 140 in accordance with a user's input.

Meanwhile, when a user's manipulation for the downward movement is input ("downward movement" of S1300), the controller 200 moves the main display 110 downward (S1700). The downward movement of the main display 110 may be performed by transmitting a downward control signal to a separate drive unit such as a motor and an actuator.

In the aforementioned embodiment, some of the components of the vehicle 10 may be implemented using a 'module'. Here, the 'module' refers to a software element or a hardware element such as a field programmable gate array (FPGA) or an application specific integrated circuit (ASIC), and the module performs predetermined functions. However, the module is not limited to the software or hardware. The module may be configured to be in a storage medium capable of addressing and may also be configured to execute one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided in the components and modules and units may be combined into fewer components and modules or may further be separated into additional components and modules. Furthermore, the components and modules may execute one or more central processing units (CPUs) in a device.

Meanwhile, the method of controlling the vehicle 10 may be implemented on a computer-readable recorded medium as computer-readable code. Computer-readable recorded media may include all types of recorded media on which data is stored that may be read by a computer system. Examples may include read only memory (ROM), random access memory (RAM), magnetic tapes, magnetic disks, flash memory, optical data storage devices, etc. Also, the computer-readable recorded medium may be distributed across a computer system connected by a computer network, to be stored and executed as code that is read in a distributed manner.

The foregoing description of the present disclosure has been presented for the purposes of illustration and description. It will be understood by those of ordinary skill in the art that the present disclosure may be easily modified into other detailed forms without changing the technical principle or essential features of the present disclosure. Therefore, the foregoing embodiments should be regarded as illustrative rather than limiting in all aspects. For example, each component which has been described as a unitary part may be implemented as distributed parts. Likewise, each component which has been described as distributed parts may be also be implemented as a combined part.

As is apparent from the above description, according to the vehicle and the method of controlling the vehicle according to embodiments of the present disclosure, the screen of the display device having a variable structure may display content suitably for a current state of the user.

In addition, since contents are assigned suitably for the current state according to the vehicle and the method of controlling the vehicle, the user may immediately recognize the current state.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle comprising:
   a display device including a main display device mounted on a center fascia located at the center of a dashboard disposed in front of a driver's seat and a front passenger's seat;
   a mode region extending from the dashboard to be spaced apart from a front surface of the main display device;
   wherein the display device is configured to display a screen divided into regions in the main display device for displaying content which is viewed over the mode region, and
   wherein the screen is divided into an upper region, a lower region, and a virtual reference region which is fixedly disposed behind the mode region between the upper and lower regions on the screen in an initial state and maintains an absolute reference position when the main display device moves upward or downward automatically or manually; and
   a controller configured to perform operations of:
      changing the divided regions of the screen of the main display device displayed by the display device in accordance with an upward movement or downward movement of the main display device, wherein the main display device scales up or scales down the upper region and the lower region of the screen for displaying different content on the upper region or lower region in accordance with the upward movement or downward movement of the main display device;
      moving the upper region to a position below the virtual reference region, the upper region is scaled down and the lower region is scaled up to the entire region at the same speed as the downward movement of the main display device by removing the upper region when the main display device moves downward entirely in a sliding manner; and
      moving the upper region back to a position above the virtual reference region, the upper region is scaled up and the lower region is scaled down at the same speed when the main display device moves upward in the sliding manner.

2. The vehicle according to claim 1, wherein the main display device is configured to display a horizontally divided screen.

3. The vehicle according to claim 1, wherein the controller is configured to move the upper region in accordance with the upward movement or downward movement of the main display device by the user's manual manipulation.

4. The vehicle according to claim 1, wherein the controller is configured to move the upper region at the same speed as a speed of the upward movement or downward movement of the main display device by the user's manual manipulation.

5. The vehicle according to claim 1, wherein the controller is configured to change the divided regions at a predetermined timing when the main display device moves upward or downward.

6. The vehicle according to claim 1, wherein the main display device is configured to move upward when the vehicle is running and moves downward when the vehicle is stopped.

7. The vehicle according to claim 1, wherein the main display device is configured to move upward when a navigation service is provided and to move downward when the navigation service is terminated.

8. The vehicle according to claim 1, wherein the main display device is configured to move upward when a driving route of the vehicle is set and to move downward when the driving route is not set.

9. The vehicle according to claim 1, wherein the main display device is implemented using a touchscreen and is configured to move downward when a screen requiring a user's touch manipulation is displayed.

10. The vehicle according to claim 1, further comprising a gear manipulation lever configured to manipulate a gear of the vehicle,
   wherein the main display device is configured to move upward when the gear manipulation lever is in a drive gear position and to move downward when the gear manipulation lever is in a neutral gear position or in a parking gear position.

11. The vehicle according to claim 1, further comprising:
   wheels;
   an accelerator pedal configured to receive a manipulation to accelerate the wheels input by a user; and
   a brake pedal configured to receive a manipulation to brake the wheels input by the user,
   wherein the main display device is configured to move upward when the acceleration manipulation is input and to move downward when the braking manipulation is input.

12. The vehicle according to claim 1, further comprising an illumination sensor,
   wherein the main display device is configured to move upward or downward in accordance with an output value of the illumination sensor.

13. The vehicle according to claim 1, wherein the display device further comprises a mode display installed in the mode region.

14. The vehicle according to claim 13, further comprising emergency lamps,
   wherein the mode display is implemented using a touchscreen, and
   the emergency lamps is configured to be turned on or off in accordance with a user's manipulation of the touchscreen.

15. The vehicle according to claim 13, wherein the mode display is configured to display different content in accordance with the upward movement or downward movement of the main display device.

16. The vehicle according to claim 1, wherein the mode region comprises a hard key configured to receive a manipulation input by the user.

17. The vehicle according to claim 1, wherein the upper region or the lower region displays different content in accordance with the upward movement or downward movement of the main display device.

18. A method of controlling a vehicle, the method comprising steps of:
   providing a display device which includes a main display device mounted on a center fascia located at the center of a dashboard disposed in front of a driver's seat and a front passenger's seat and providing a mode region extending from the dashboard to be spaced apart from a front surface of the main display device;
   displaying a screen that is divided into regions in the main display device for displaying content which is viewed over the mode region, the screen being divided into an upper region, a lower region, and a virtual reference region which is fixedly disposed behind the mode region between the upper and lower regions on the screen in an initial state and maintains an absolute reference position when the main display device moves upward or downward automatically or manually;
   determining whether to move upward or downward the main display device;
   changing the divided regions of the screen of the main display device displayed by the main display device in accordance with an upward movement or downward movement of the main display device, wherein the main display device scales up or scales down the upper region and the lower region of the screen for displaying different content on the upper region or lower region in accordance with the upward movement or downward movement of the main display device;
   moving the upper region to a position below the virtual reference region, the upper region is scaled down and the lower region is scaled up to the entire region at the same speed as the downward movement of the main display device by removing the upper region when the main display device moves downward entirely in a sliding manner; and
   moving the upper region back to a position above the virtual reference region, the upper region is scaled up and the lower region is scaled down at the same speed when the main display device moves upward in the sliding manner.

* * * * *